(12) United States Patent
Ueda et al.

(10) Patent No.: US 10,784,035 B2
(45) Date of Patent: Sep. 22, 2020

(54) COIL DEVICE AND COIL SYSTEM

(71) Applicant: IHI CORPORATION, Tokyo (JP)

(72) Inventors: Akio Ueda, Tokyo (JP); Susumu Tokura, Tokyo (JP); Kenji Nishimura, Tokyo (JP); Motonao Niizuma, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 112 days.

(21) Appl. No.: 15/754,347

(22) PCT Filed: Aug. 19, 2016

(86) PCT No.: PCT/JP2016/074224
§ 371 (c)(1),
(2) Date: Feb. 22, 2018

(87) PCT Pub. No.: WO2017/033859
PCT Pub. Date: Mar. 2, 2017

(65) Prior Publication Data
US 2018/0254136 A1   Sep. 6, 2018

(30) Foreign Application Priority Data

Aug. 25, 2015 (JP) ................................. 2015-165799
Sep. 8, 2015 (JP) ................................. 2015-176910

(51) Int. Cl.
*H01F 27/10* (2006.01)
*H01F 38/14* (2006.01)
*H02J 50/12* (2016.01)
*H02J 7/02* (2016.01)
*H01F 27/30* (2006.01)
*B60L 53/122* (2019.01)
(Continued)

(52) U.S. Cl.
CPC ............ *H01F 27/10* (2013.01); *B60L 53/122* (2019.02); *H01F 27/28* (2013.01); *H01F 27/306* (2013.01); *H01F 38/14* (2013.01); *H02J 7/025* (2013.01); *H02J 50/10* (2016.02); *H02J 50/12* (2016.02); *H04B 5/0037* (2013.01); *H04B 5/0081* (2013.01); *H01F 1/44* (2013.01)

(58) Field of Classification Search
CPC ........ H01F 27/10; H01F 27/28; H01F 27/306; H01F 38/14; H01F 1/44; H02J 50/10; H02J 50/12; H02J 7/025; B60L 53/122; H04B 5/0037; H04B 5/0081
See application file for complete search history.

(56) References Cited

U.S. PATENT DOCUMENTS 5,462,685 A    10/1995  Raj et al.
2010/0221373 A1*  9/2010  Chen ................... B29C 33/04
                                                      425/3
(Continued)

FOREIGN PATENT DOCUMENTS

CN    103339698 A      10/2013
DE    112014000735 T5  10/2015
(Continued)

*Primary Examiner* — Daniel Kessie
(74) *Attorney, Agent, or Firm* — Volpe and Koenig, P.C.

(57) ABSTRACT

A coil device according to an aspect of this disclosure includes a coil portion including a conductive wire and a holding member that holds the conductive wire, and a cooling flow path through which a cooling fluid flows is provided in the holding member.

5 Claims, 18 Drawing Sheets

(51) Int. Cl.
*H01F 27/28* (2006.01)
*H02J 50/10* (2016.01)
*H04B 5/00* (2006.01)
*H01F 1/44* (2006.01)

(56) References Cited

U.S. PATENT DOCUMENTS

| | | | |
|---|---|---|---|
| 2013/0055727 A1* | 3/2013 | Choi | G06F 1/203 |
| | | | 62/3.1 |
| 2014/0084697 A1 | 3/2014 | Yasuda | |
| 2014/0232331 A1* | 8/2014 | Stamenic | B60L 53/36 |
| | | | 320/108 |
| 2014/0253275 A1* | 9/2014 | Shijo | H01F 27/34 |
| | | | 336/105 |
| 2015/0130288 A1* | 5/2015 | Ichikawa | B60L 53/122 |
| | | | 307/104 |
| 2015/0327405 A1* | 11/2015 | Niizuma | H02J 50/12 |
| | | | 307/104 |
| 2015/0332845 A1* | 11/2015 | Werner | H04B 5/0037 |
| | | | 307/104 |
| 2017/0288469 A1* | 10/2017 | Murashige | H02J 50/10 |
| 2017/0338023 A1* | 11/2017 | Ansari | H01F 38/14 |
| 2018/0141451 A1* | 5/2018 | Totsuka | H01F 27/2876 |
| 2018/0374624 A1* | 12/2018 | Yuasa | H01F 27/08 |

FOREIGN PATENT DOCUMENTS

| | | |
|---|---|---|
| JP | 53-159263 U | 12/1978 |
| JP | 54-114716 A | 9/1979 |
| JP | 60-190437 U | 12/1985 |
| JP | 03-112326 A | 5/1991 |
| JP | 11-087140 A | 3/1999 |
| JP | 2000-236649 A | 8/2000 |
| JP | 2001-060506 A | 3/2001 |
| JP | 2004-140259 A | 5/2004 |
| JP | 2005-224001 A | 8/2005 |
| JP | 2009-218417 A | 9/2009 |
| JP | 2010-268660 A | 11/2010 |
| JP | 2012-119615 A | 6/2012 |
| JP | 2012-156083 A | 8/2012 |
| JP | 2012-228122 A | 11/2012 |
| JP | 2012-228123 A | 11/2012 |
| JP | 2013-055229 A | 3/2013 |
| JP | 2015-012066 A | 1/2015 |
| JP | 2015-149635 * | 5/2015 |
| JP | 2013-080785 A | 5/2016 |
| WO | 2012/099170 A1 | 7/2012 |
| WO | 2014/057587 A1 | 4/2014 |
| WO | 2014/123234 A1 | 8/2014 |
| WO | 2016/143341 A1 | 9/2016 |

* cited by examiner

COIL DEVICE AND COIL SYSTEM

TECHNICAL FIELD

This disclosure relates to a coil device and a coil system.

BACKGROUND ART

A wireless power transfer system includes a coil device for power transmission corresponding to a part of a power transmitter and a coil device for power reception corresponding to a part of a power receiver, and implements wireless power feeding using magnetic coupling between coils of an electromagnetic induction scheme, a magnetic resonance scheme, etc. In such a coil device, heat is generated by internal resistance of a coil, and a temperature inside the coil device rises. As a result, for example, coating of a conductive wire deteriorates and an electrical insulation property is degraded.

A coil device that suppresses a temperature rise of a coil has been known as a conventional coil device (for example, see Patent Document 1). The coil device described in Patent Document 1 includes a protective member as a casing for accommodating the coil. A flow path through which a liquid such as water flows is provided in the protective member to cool the heated coil.

CITATION LIST

Patent Literature

Patent Document 1: Japanese Unexamined Patent Publication No. 2012-228123

SUMMARY OF INVENTION

Technical Problem

In the above-described coil device, heat generated in the coil (a conductive wire or a coil portion) is transmitted to a fluid in the flow path of the protective member after passing through air present between the conductive wire and the protective member. That is, air is present in a transfer path for heat generated from the conductive wire. For this reason, cooling efficiency of the conductive wire has been degraded.

An object of this disclosure is to provide a coil device capable of improving cooling efficiency of a conductive wire or a coil portion.

Solution to Problem

A coil device according to an aspect of this disclosure includes a coil portion including a conductive wire and a holding member that holds the conductive wire, in which a cooling flow path through which a cooling fluid flows is provided in the holding member.

A first coil device according to an aspect of this disclosure includes a first coil portion, a housing that accommodates the first coil portion, and a coolant which is located inside the housing and has fluidity and thermal conductivity.

Effects of Invention

According to some aspects of this disclosure, it is possible to improve cooling efficiency of a conductive wire or a coil portion.

DESCRIPTION OF EMBODIMENTS

Figure 1:
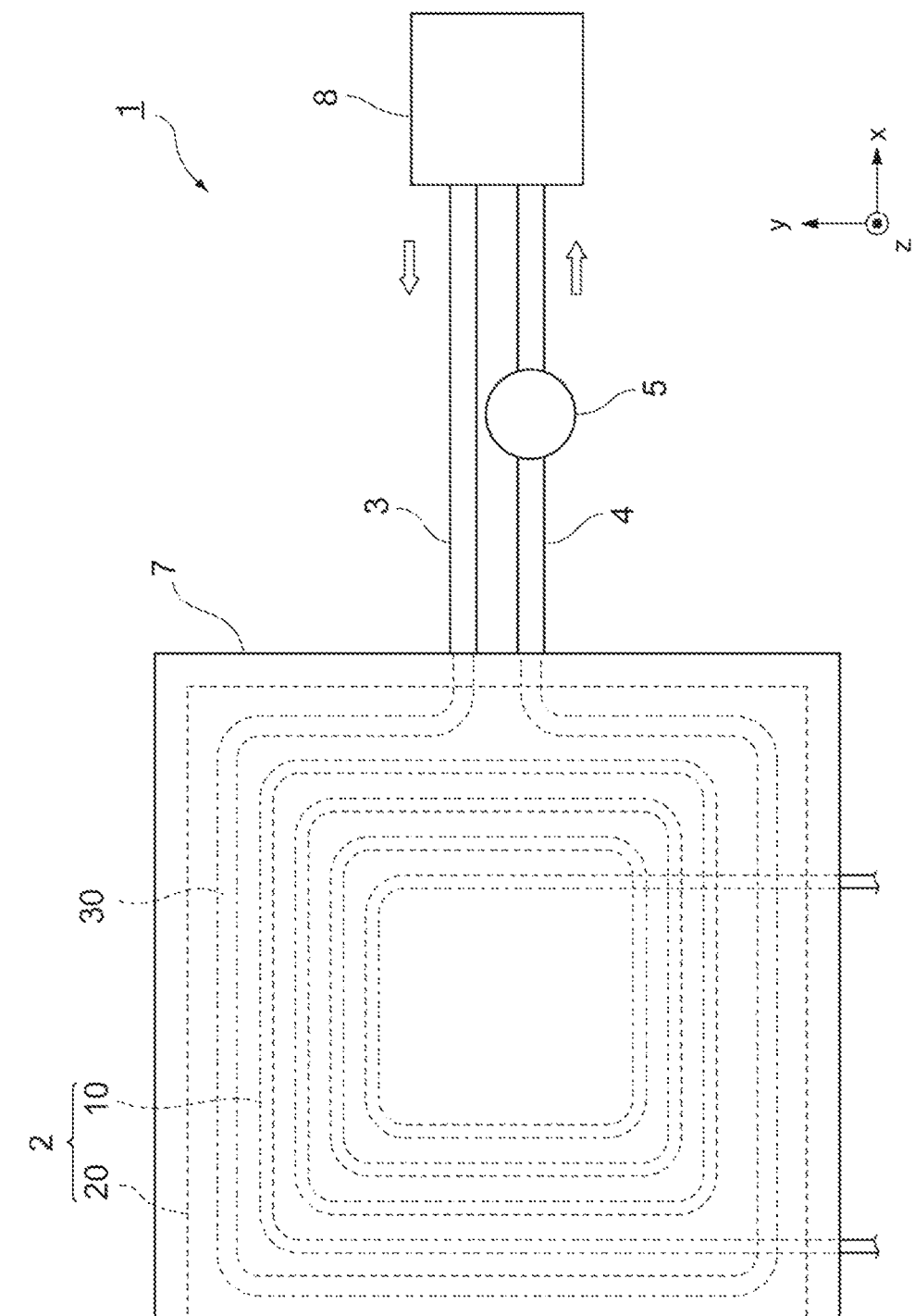
FIG. 1 is an overall configuration diagram of a coil device according to a first embodiment of this disclosure.

A coil device according to an aspect of this disclosure includes a coil portion including a conductive wire and a holding member that holds the conductive wire, in which a cooling flow path through which a cooling fluid flows is provided in the holding member.

In this coil device, the cooling flow path through which the cooling fluid flows is provided in the holding member. By this configuration, heat generated in the conductive wire is directly transmitted to the cooling fluid in the cooling flow path through the holding member. Therefore, it is possible to improve cooling efficiency of the conductive wire.

In some aspects, the holding member includes a first region in which the conductive wire is held and a second region outside of the first region, and the cooling flow path is provided in the second region. In this case, the first region is heated by the conductive wire, and the second region is cooled by the cooling fluid. For this reason, a temperature gradient is generated between the first region and the second region. Due to this temperature gradient, the heat of the conductive wire is smoothly transmitted to the cooling fluid. By this configuration, it is possible to reliably improve cooling efficiency of the conductive wire.

In some aspects, the cooling flow path is provided to surround the first region. In this case, the cooling fluid flows around the first region. For this reason, the heat of the conductive wire is transmitted to spread toward a periphery of the first region. Therefore, it is possible to further improve cooling efficiency of the conductive wire.

In some aspects, the holding member includes a first region in which the conductive wire is held and a second region outside of the first region, and the cooling flow path extends from a center portion of the first region to the second region. Heat is easily trapped and a temperature is prone to rise in the center portion of the first region. For this reason, when the cooling fluid is supplied from the center portion side of the first region, it is possible to cool the center portion of the first region, which is likely to rise in temperature, while cooling capacity of the cooling fluid is high. Therefore, cooing efficiency of the conductive wire can be further improved. The outer periphery of the first region is less likely to rise in temperature than the center portion of the first region. For this reason, the outer periphery of the first region may be sufficiently cooled even using the cooling fluid passing through the center portion of the first region.

In some aspects, the conductive wire is wound in the holding member and includes a plurality of extending portions adjacent to each other, and the cooling flow path is provided between the plurality of extending portions of the conductive wire. In this case, since a distance between the conductive wire (extending portion) and the cooling flow path (a length of a heat transfer path) becomes short, it is possible to further improve cooling efficiency of the conductive wire.

In some aspects, the conductive wire includes a plurality of extending portions extending in the holding member, and the cooling flow path is provided to surround an outer circumferential surface of at least one of the extending portions. In this case, the cooling fluid flows around the conductive wire. For this reason, the heat of the conductive wire is transmitted toward a periphery of the conductor. Therefore, it is possible to further improve cooling efficiency of the conductive wire.

In some aspects, the cooling flow path includes a plurality of flow path portions having different flow path diameters. In this case, in a region in which the temperature of the holding member is likely to rise, a flow path diameter of a flow path portion may be decreased to increase a flow speed of the cooling fluid, thereby improving cooling efficiency of the conductive wire. On the other hand, in a region in which the temperature of the holding member rarely rises, a flow path diameter of a flow path portion may be increased to reduce a pressure loss of the cooling flow path, thereby guaranteeing smooth circulation of the cooling fluid.

In some aspects, the coil device further includes a housing that accommodates the coil portion, in which the cooling flow path leads to an outside of the housing. In this case, the cooling fluid is supplied from the outside of the housing, and thus the cooling fluid adjusted to a desired temperature outside the housing may be supplied into the housing. In this way, it is possible to reliably improve cooling efficiency of the conductive wire.

A first coil device according to an aspect of this disclosure includes a first coil portion, a housing that accommodates the first coil portion, and a coolant located inside the housing, the coolant having fluidity and thermal conductivity.

The first coil device is located inside the housing and includes a coolant having fluidity and thermal conductivity. By this configuration, heat generated in the first coil portion is radiated to the outside of the housing through the coolant. Therefore, cooling efficiency of the first coil portion can be improved.

In some aspects, the coolant contains a cooling fluid and magnetic powder mixed in the cooling fluid. Since the coolant contains the magnetic powder, thermal conductivity of the coolant is improved. Therefore, it is possible to further improve cooling efficiency of the first coil portion.

In some aspects, the magnetic powder is treated with a surface treatment that lowers affinity with the cooling fluid. By this configuration, aggregation between magnetic powders is suppressed, and an eddy current is less likely to flow in the magnetic powder. As a result, heat generation from the magnetic powder is suppressed.

In some aspects, the first coil portion includes a conductive wire and a holding member that holds the conductive wire, the conductive wire of the first coil portion is wound in a planar spiral shape in the holding member, the first coil device further includes a restriction member that surrounds a central axis of the wound conductive wire to allow passage of the cooling fluid and restrict passage of the magnetic powder, the magnetic powder is present outside the restriction member, and the restriction member restricts movement of the magnetic powder into the central axis side. In this way, the magnetic powder may be moved away from a magnetic pole present around the central axis of the wound conductive wire. For this reason, it is possible to inhibit magnetic flux generated from one magnetic pole of the first coil device from returning to the other magnetic pole of the first coil device without passing through a second coil portion due to an influence of the magnetic powder.

A coil system according to an aspect of this disclosure includes the first coil device and a second coil device including a second coil portion, in which at least one of a phase or an amplitude is different between a current flowing through the first coil portion of the first coil device and a current flowing through the second coil portion of the second coil device.

When a current flows through each of the first and second coil portions, a magnetic field is generated by each of the first and second coil devices, and a magnetic force is generated in magnetic powder present in a gradient magnetic field. In this coil system, at least one of the phase and the amplitude is different between the current flowing through the first coil portion and the current flowing through the second coil portion, or directions and magnitudes of gradients of magnetic fields generated by these currents are different from each other, so that a difference occurs between magnetic forces acting on the magnetic powder, and a magnetic gradient is generated between the first and second coil devices. A direction of the magnetic gradient is repeatedly inverted between the first and second coil portions in accordance with a period of a current (alternating current) flowing through each of the first and second coil portions. Since the magnetic powder is pulled by a coil device on a stronger magnetic force side, a direction in which the magnetic powder is pulled is repeatedly inverted in accordance with the period of the current. For this reason, a direction of movement of the magnetic powder changes, and a coolant is agitated. In this way, a warmed coolant does not remain on a side close to the first coil portion, and unheated coolant moves to a side close to the first coil portion. As a result, it is possible to improve cooling efficiency of the first coil portion.

The coil system according to some aspects is a coil system performing wireless power transfer between the first coil device and the second coil device, and further includes a power supply unit which is connected to the first coil device on a power transmission side and is capable of switching a frequency of a current supplied to the first coil device between a first frequency for wireless power transfer and a second frequency smaller than the first frequency. When the current having the second frequency is supplied to the first coil device, a timing at which a direction of a magnetic gradient generated between the first and second coil devices is reversed is delayed when compared to a case in which the current having the first frequency is supplied to the first coil device, and a timing at which the direction in which the magnetic powder is pulled is reversed is delayed. In other words, a moving distance of the magnetic powder is increased by switching the frequency of the current to the second frequency when compared to the case of the first frequency. By this configuration, a moving distance of a cooling fluid increases, and thus the coolant is further agitated. Therefore, it is possible to further improve cooling efficiency of the first coil portion.

The coil system according to some aspects is a coil system performing wireless power transfer between the first coil device and the second coil device, and further includes a power supply unit which is connected to the second coil device on a power transmission side and is capable of switching a frequency of a current supplied to the second coil device between a first frequency for wireless power transfer and a second frequency smaller than the first frequency. When the current having the second frequency is supplied to the second coil device, a timing at which a direction of a magnetic gradient generated between the respective coil devices is reversed is delayed when compared to a case in which the current having the first frequency is supplied to the second coil device, and a timing at which the direction in which the magnetic powder is pulled is reversed is delayed. In other words, a moving distance of the magnetic powder is increased by switching the frequency of the current to the second frequency when compared to the case of the first frequency. By this configuration, a moving distance of a cooling fluid increases, and thus the coolant is further agitated. Therefore, it is possible to further improve cooling efficiency of the first coil portion.

Hereinafter, embodiments of the disclosure will be described with reference to drawings. In description of the drawings, the same reference numeral will be assigned to the same element, and a repeated description will be omitted.

First Embodiment

A coil device 1 according to a first embodiment will be described with reference to FIG. 1 to FIG. 3. For example, the coil device 1 is applied to a wireless power transfer system. The wireless power transfer system is a system for supplying power from a power transmitter to a power receiver. The power transmitter and the power receiver are separated from each other in a vertical direction. The power transmitter is installed on a parking lot, etc. and the power receiver is mounted in an electric vehicle. The wireless power transfer system is configured to supply power to the electric vehicle EV arriving at the parking lot, etc. using a magnetic resonance scheme, an electromagnetic induction scheme, etc. The coil device 1 is applied as a coil device for power transmission corresponding to a part of the power transmitter and/or a coil device for power reception corresponding to a part of the power receiver. In coordinates of the figure, a direction in which the coil device for power transmission faces the coil device for power reception at the time of power feeding is defined as the vertical direction Z. Directions orthogonal to the vertical direction Z are defined as a direction X and a direction Y. The direction X and the direction Y are orthogonal to each other. An example of the wireless power transfer system (coil system) is described in sixth and seventh embodiments.

Figure 3:
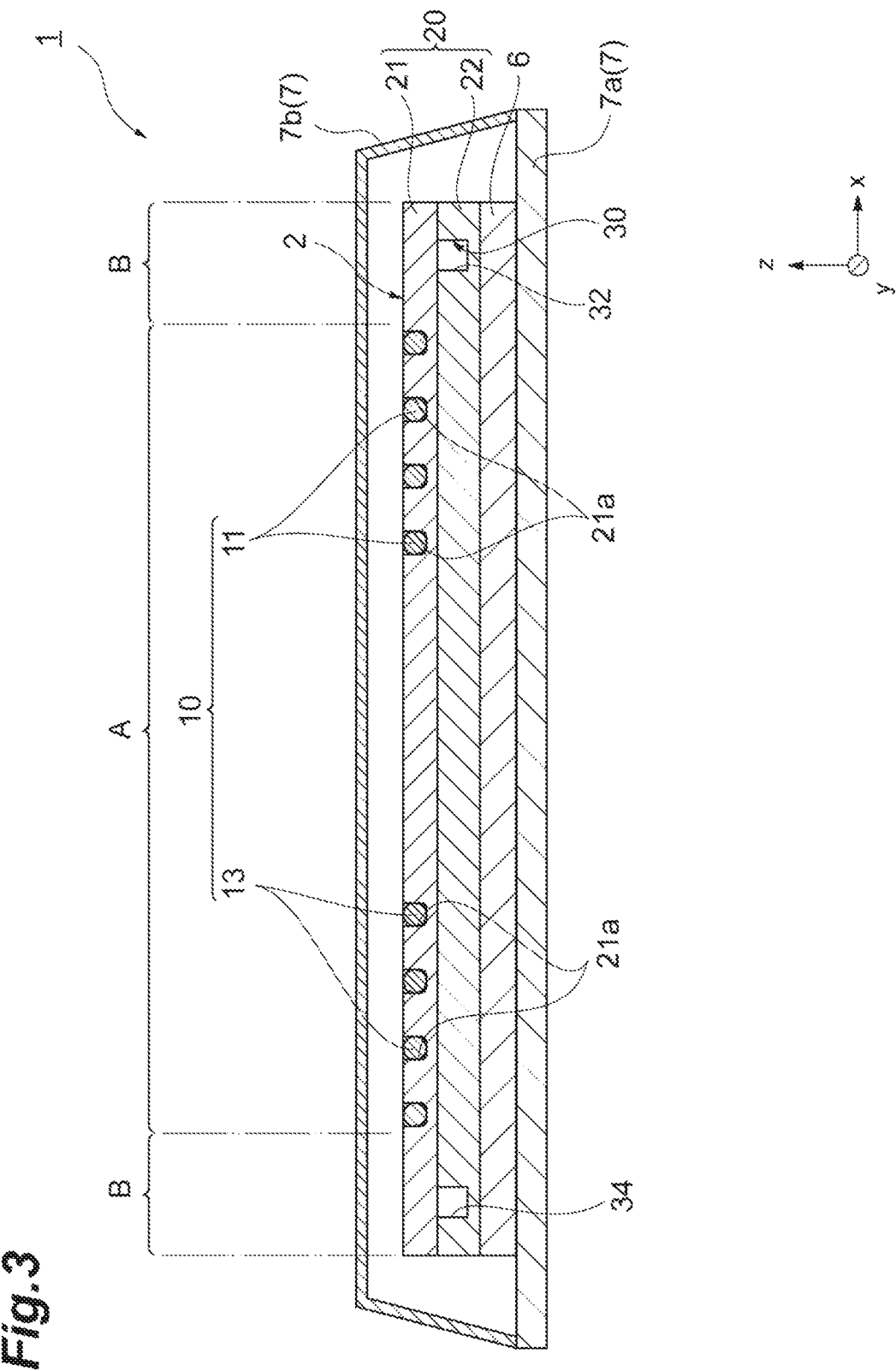
FIG. 3 is a cross-sectional view taken along III-III line of FIG. 2.

As illustrated in FIG. 3, the coil device 1 includes a flat plate-shaped coil portion 2, a flat plate-shaped magnetic member 6 on which the coil portion 2 is placed, and a housing 7 that accommodates the coil portion 2 and the magnetic member 6. The coil portion 2 includes a conductive wire 10 and a holding member 20 that holds the conductive wire 10. The magnetic member 6 directs and aggregates lines of magnetic force generated from the coil portion 2. For example, the magnetic member 6 is a magnetic substance (a ferrite plate, etc.).

For example, the housing 7 has a shape of a flat rectangular parallelepiped, and includes a flat plate-shaped base 7a and a cover 7b that covers the coil portion 2. The coil portion 2 is placed on the base 7a with the magnetic member 6 interposed therebetween. The base 7a ensures strength of the coil device 1, and inhibits a magnetic flux due to the coil portion 2 from leaking to a rear side of the base 7a (an opposite side from the cover 7b side). For example, the base 7a is made of a nonmagnetic and electrically conductive material (copper, aluminum, etc.). The cover 7b has an opening on the base 7a side and faces a surface of the coil portion 2 (a surface on the cover 7b side). For example, the cover 7b is made of a nonmagnetic and insulating material (polyphenylene sulfide resin, etc.). By a peripheral portion of the base 7a and a peripheral portion of the opening of the cover 7b being joined together, an accommodating space for the coil portion 2 and the magnetic member 6 is formed.

As illustrated in FIG. 1, the coil device 1 further includes a heat exchanger 8, a supply pipe 3 and a discharge pipe 4 connected to the heat exchanger 8, and a pump 5. The heat exchanger 8 adjusts a cooling fluid circulating inside to a desired temperature. For example, insulating oil is used as the cooling fluid. The cooling fluid is not limited thereto, and may be a fluid having heat transferability. For example, the cooling fluid may correspond to water. The heat exchanger 8 is disposed outside the housing 7. One end portions of the supply pipe 3 and the discharge pipe 4 are connected inside the heat exchanger 8. Each of the other end portions of the supply pipe 3 and the discharge pipe 4 penetrates the cover 7b. The supply pipe 3, the discharge pipe 4, and a cooling flow path 30 provided in the holding member 20 form a circulation flow path for circulating the cooling fluid. The pump 5 is provided in the circulation flow path. For example, the pump 5 is provided in the discharge pipe 4. When the pump 5 is driven, the cooling fluid circulates through the circulation flow path.

Next, a detailed description will be given of the conductive wire 10 and the holding member 20 included in the coil portion 2.

Figure 2:
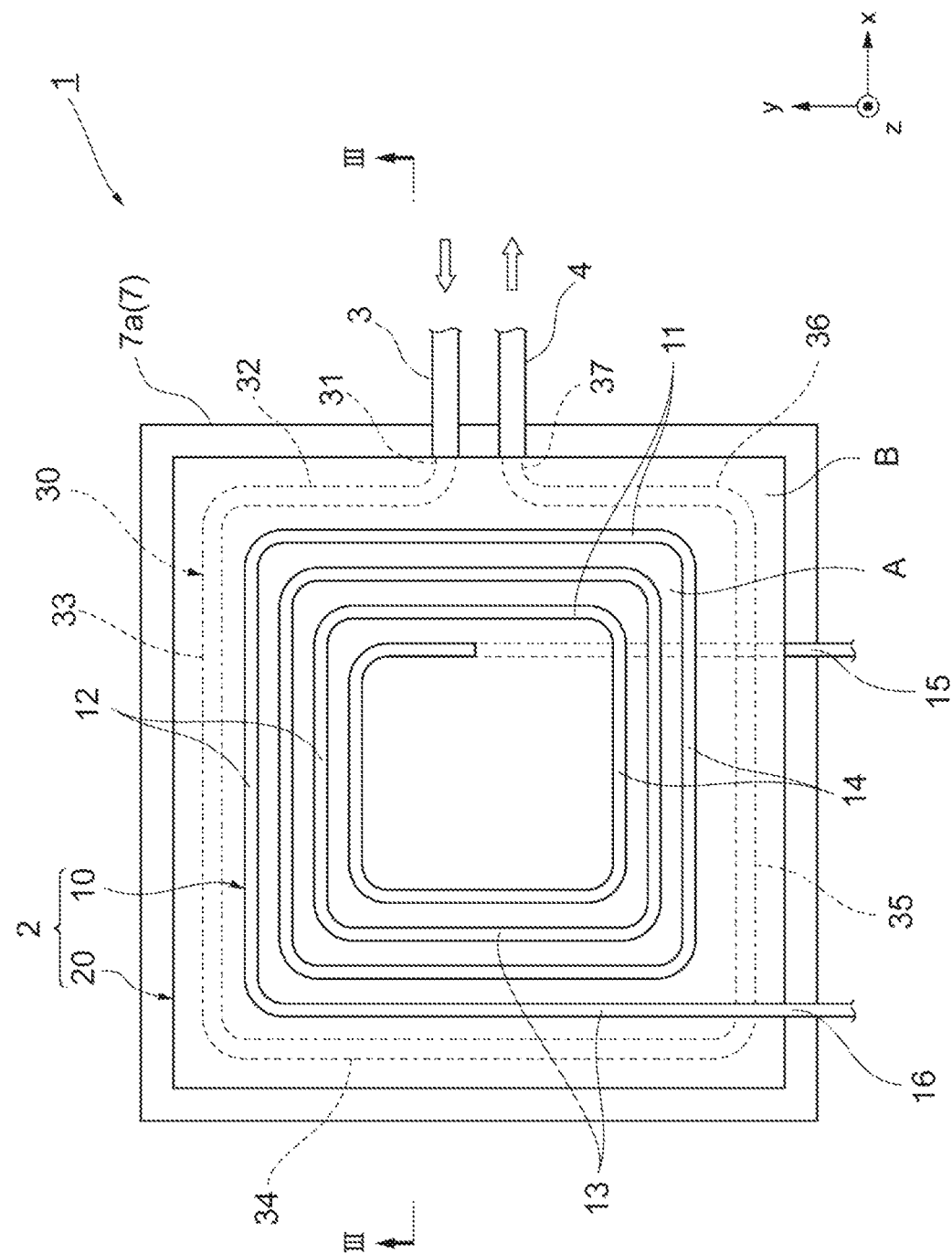
FIG. 2 is a plan view of the coil device of FIG. 1.

As illustrated in FIG. 2, the conductive wire 10 is wound in a planar spiral shape on a surface side of the holding member 20. In FIG. 2, illustration of the cover 7b is omitted. The conductive wire 10 is wound in a substantially rectangular shape. The coil portion 2 is a circular type coil portion. In the circular type coil portion 2, the conductive wire 10 may be wound in various shapes such as a rectangular shape, a circular shape, an elliptical shape, etc. when viewed from a winding axis direction (the vertical direction Z). For example, a single wire of copper or aluminum, a litz wire, a bus bar, etc. is used as the conductive wire 10.

The conductive wire 10 may correspond to the litz wire. In particular, in the wireless power transfer system, a current of a radio frequency (for example, kHz order or more) may be allowed to flow to the coil device 1 to achieve extension of a power transmission distance, an improvement in transmission efficiency, etc. In general, when a current flowing through the conductive wire 10 corresponds to a radio frequency, skin effect occurring in the conductive wire 10 becomes large. As the skin effect increases, resistance in the conductive wire 10 increases, and heat loss increases. The increase in heat loss leads to a decrease in power efficiency of the whole wireless power transfer system (for example, a ratio of an battery input on the power receiver side to a power output on the power transmitter side). The litz wire is used to suppress the skin effect. The litz wire is formed by twisting a plurality of conductor elements insulated from each other.

A more detailed description will be given of arrangement of the conductive wire 10 in the coil portion 2. The conductive wire 10 includes a plurality of first extending portions 11, a plurality of second extending portions 12, a plurality of third extending portions 13, a plurality of fourth extending portions 14, a first lead-out portion 15, and a second lead-out portion 16. For example, the first extending portions 11, the second extending portions 12, the third extending portions 13, and the fourth extending portions 14 are formed in straight lines and included in respective parts of a circumference of the conductive wire 10 by being continued in order. The first extending portions 11 and the third extending portions 13 extend along a direction Y. The second extending portions 12 and the fourth extending portions 14 extend along a direction X. Bent portions curved substantially at right angles are provided between the first extending portions 11 and the second extending portions 12, between the second extending portions 12 and the third extending portions 13, between the third extending portions 13 and the fourth extending portions 14, and between the fourth extending portions 14 and the first extending portions 11, respectively. The plurality of first extending portions 11 are parallel to each other and have a predetermined interval. The plurality of second extending portions 12 are parallel to each other and have a predetermined interval. The plurality of third extending portions 13 are parallel to each other and have a predetermined interval. The plurality of fourth extending portions 14 are parallel to each other and have a predetermined interval.

The first lead-out portion 15 is led out from a distal end of the first extending portions 11 located on an innermost side of the conductive wire 10 to a rear surface (a surface on the base 7a side) side of the holding member 20. The first lead-out portion 15 extends substantially in parallel with an extending direction of the first extending portions 11, and is led out to an outside of the holding member 20. The second lead-out portion 16 is led out from a distal end of the third extending portions 13 located on an outermost side. The second lead-out portion 16 extends substantially in parallel with an extending direction of the third extending portions 13, and is led out to the outside of the holding member 20. The first lead-out portion 15 and the second lead-out portion 16 are led out in the same direction and to, for example, a side at which the fourth extending portions 14 are located.

For example, the holding member 20 has a rectangular flat plate shape. The holding member 20 has a first region A in which the conductive wire 10 is held and a second region B which is outside of the first region A. The conductive wire 10 is wound in the first region A, and the conductive wire 10 is not wound in the second region B. The first region A is located at a center portion of the holding member 20, and the second region B is located to surround the first region A. A center of the first region A may not rigorously match a center of the holding member 20. The center of the first region A may be shifted from the center of the holding member 20.

More specifically, as illustrated in FIG. 3, the holding member 20 includes an upper member 21 and a lower member 22. The upper member 21 and the lower member 22 are a pair of rectangular flat plate-shaped member having substantially the same size. The upper member 21 and the lower member 22 have a two-layer structure. The holding member 20 is configured by a rear surface of the upper member 21 and a front surface of the lower member 22 facing and coining into contact with each other. A front surface of the upper member 21 corresponds to a front surface of the holding member 20, and a rear surface of the lower member 22 corresponds to a rear surface of the holding member 20. For example, the upper member 21 and the lower member 22 are made of a nonmagnetic and insulating material (polyphenylene sulfide resin, etc.). The first region A of the holding member 20 includes center portions of the upper member 21 and the lower member 22, and the second region B of the holding member 20 includes outer peripheries of the upper member 21 and the lower member 22.

A groove 21a for accommodating the conductive wire 10 is provided on the upper member 21. The groove 21a is open to a front surface side of the holding member 20. For example, a shape of a cross section perpendicular to an extending direction of the groove 21a is a substantially rectangular shape whose one side is open. The cross-sectional shape of the groove 21a is not limited thereto, and may correspond to a substantially U-shape, etc. Any one of a side surface or a bottom surface of the groove 21a may come into contact with the accommodated conductive wire 10.

The cooling flow path 30 through which the cooling fluid flows is provided in the holding member 20. As illustrated in FIG. 2, the cooling flow path 30 corresponds to one flow path and is provided in the second region B to surround the first region A. For example, a shape of a cross section perpendicular to an extending direction of the cooling flow path 30 is a substantially rectangular shape. The cross-sectional shape of the cooling flow path 30 is not limited thereto, and may correspond to a substantially U-shape, etc.

The cooling flow path 30 includes an inflow portion 31 and an outflow portion 37 provided on a side of the first extending portions 11 and a first straight portion 32, a second straight portion 33, a third straight portion 34, a fourth straight portion 35, and a fifth straight portion 36 continuously extending to surround the first region A. The first straight portion 32, the second straight portion 33, the third straight portion 34, the fourth straight portion 35, and the fifth straight portion 36 are continued in order between the inflow portion 31 and the outflow portion 37, and form a rectangular shape as a whole.

The first straight portion 32 and the fifth straight portion 36 extend along a first extending portion 11 located on an outermost side. The second straight portion 33 extends along a second extending portion 12 located on an outermost side. The third straight portion 34 extends along a third extending portion 13 located on an outermost side. The fourth straight portion 35 extends along a fourth extending portion 14 located on an outermost side. Respective connecting portions (that is, bent portions) of the inflow portion 31, the outflow portion 37, and the respective straight portions 32, 33, 34, 35, and 36 have curved shapes to reduce flow resistance of the cooling fluid. The inflow portion 31 leads to one end of the supply pipe 3 located inside the housing 7.

The outflow portion 37 leads to one end of the discharge pipe 4 located inside the housing 7.

The cooling flow path 30 is formed by a groove provided on the lower member 22 and a rear surface portion of the upper member 21 which closes an open portion of the groove on a front surface side. The cooling flow path 30 is incorporated in the holding member 20. A sealing member (not illustrated) such as a packing, an O-ring, etc. is provided between the upper member 21 and the lower member 22 along the cooling flow path 30 such that the cooling fluid does not leak from the holding member 20. In this way, while the cooling flow path 30 is provided on the lower member 22, the conductive wire 10 is provided in the upper member 21. Therefore, positions of the conductive wire 10 and the cooling flow path 30 in the winding axis direction of the conductive wire 10 are different from each other.

In the coil device 1 configured as described above, the cooling fluid circulates between the supply pipe 3 and the discharge pipe 4, and the cooling flow path 30 provided on the holding member 20. Specifically, first, the cooling fluid flowing out from the inside of the heat exchanger 8 flows through the supply pipe 3. Subsequently, the cooling fluid flows through the inflow portion 31, the respective straight portions 32, 33, 34, 35, and 36, and the outflow portion 37 in this order. The cooling fluid flowing out from the cooling flow path 30 returns to the inside of the heat exchanger 8 through the discharge pipe 4. In this instance, heat generated in the conductive wire 10 is transmitted to the holding member 20 through at least one of the side surface and the bottom surface of the groove 21a. The heat transmitted to the holding member 20 is transmitted to the cooling fluid flowing in the cooling flow path 30. The cooling fluid having a temperature increased due to transfer of the heat of the conductive wire 10 is cooled again in the heat exchanger 8.

As described above, in the coil device 1, the cooling flow path 30 through which the cooling fluid flows is provided in the holding member 20. By this configuration, the heat generated in the conductive wire 10 is directly transmitted to the cooling fluid in the cooling flow path 30 through the holding member 20. In particular, in the coil device 1, any one of the side surface and the bottom surface of the groove 21a comes into contact with the conductive wire 10. For this reason, air is not present in a transfer path of the heat generated in the conductive wire 10. In addition, even when air is present in the transfer path of the heat, a proportion of air in the transfer path is small. Therefore, it is possible to improve cooling efficiency of the conductive wire 10.

The holding member 20 has the first region A in which the conductive wire 10 is held and the second region B on the outside of the first region A, and the cooling flow path 30 is provided in the second region B. The first region A is heated by the conductive wire 10, and the second region B is cooled by the cooling fluid. For this reason, a temperature gradient is generated between the first region A and the second region B. Due to this temperature gradient, the heat of the conductive wire 10 is smoothly transmitted to the cooling fluid. In this way, it is possible to reliably improve cooling efficiency of the conductive wire 10.

The cooling flow path 30 is provided to surround the first region A. By this configuration, the cooling fluid flows around the first region A. For this reason, the heat of the conductive wire 10 is transmitted to spread toward a periphery of the first region A. Therefore, it is possible to further improve cooling efficiency of the conductive wire 10.

The cooling flow path 30 leads to an outside of the housing 7. By this configuration, the cooling fluid is supplied from the outside of the housing 7, and thus the cooling fluid adjusted to a desired temperature outside the housing 7 may be supplied into the housing 7. Therefore, it is possible to reliably improve cooling efficiency of the conductive wire 10.

The cooling flow path 30 is provided in the second region B. By this configuration, the conductive wire 10 may be densely wound in the first region A. As a result, it is possible implement desired power transmission performance by increasing an inductance.

When the cooling flow path 30 is provided in the second region B, since the second region B does not hold the conductive wire 10, the conductive wire 10 and the cooling flow path 30 do not interfere with each other. For this reason, the cooling flow path 30 may be provided on the upper member 21 rather than the lower member 22. For example, a groove may be provided on the upper member 21 such that the rear surface of the upper member 21 is open, and an open portion of the upper member 21 may be closed by the front surface of the lower member 22. In this case, since the cooling flow path 30 is not provided on the lower member 22, a thickness of the lower member 22 may be reduced. Therefore, the conductive wire 10 is which the holding member 20 is held and the magnetic member 6 may be brought close to each other. In this way, when the conductive wire 10 and the cooling flow path 30 are provided at substantially the same position in the vertical direction Z (when the cooling flow path 30 is not provided between the conductive wire 10 and the magnetic member 6 in the vertical direction Z), the conductive wire 10 and the magnetic member 6 may be brought close to each other. In this way, it is possible implement desired power transmission performance by increasing an inductance.

The cooling flow path 30 is incorporated in the holding member 20, and does not protrude to the cover 7b side. That is, the cooling flow path 30 is not provided between the cover 7b and the conductive wire 10 in the vertical direction Z. When the cooling flow path 30 is provided between the cover 7b and the conductive wire 10, the cover 7b and the conductive wire 10 need to be separated from each other by the extent that the cooling flow path 30 protrudes to the cover 7b side. In other words, the accommodating space between the base 7a and the cover 7b needs to be enlarged, and a thickness of the cover 7b in the vertical direction Z increases. In this case, the coil device on the power transmission side obstructs passage of a pedestrian, and the coil device on the power reception side is prone to collide with a curbstone, an obstacle on a road, etc. Because the cooling flow path 30 does not protrude to the cover 7b side, it is possible to reduce the thickness of the cover 7b, and to suppress passage obstruction or contact with an obstacle. In addition, when an interval between the coil device for power transmission and the coil device for power reception is set to a desired value, a distance between covers of these coil devices is measured as a distance between the coil devices. In this case, when the cover 7b and the conductive wire 10 are separated from each other, the conductive wire 10 of the coil device on the power transmission side and the conductive wire 10 of the coil device on the power reception side are separated from each other, and a coupling coefficient between the coil devices becomes small. For this reason, power efficiency decreases. Because the cooling flow path 30 does not protrude to the cover 7b side, the decrease in power efficiency is suppressed.

Second Embodiment

Figure 4:
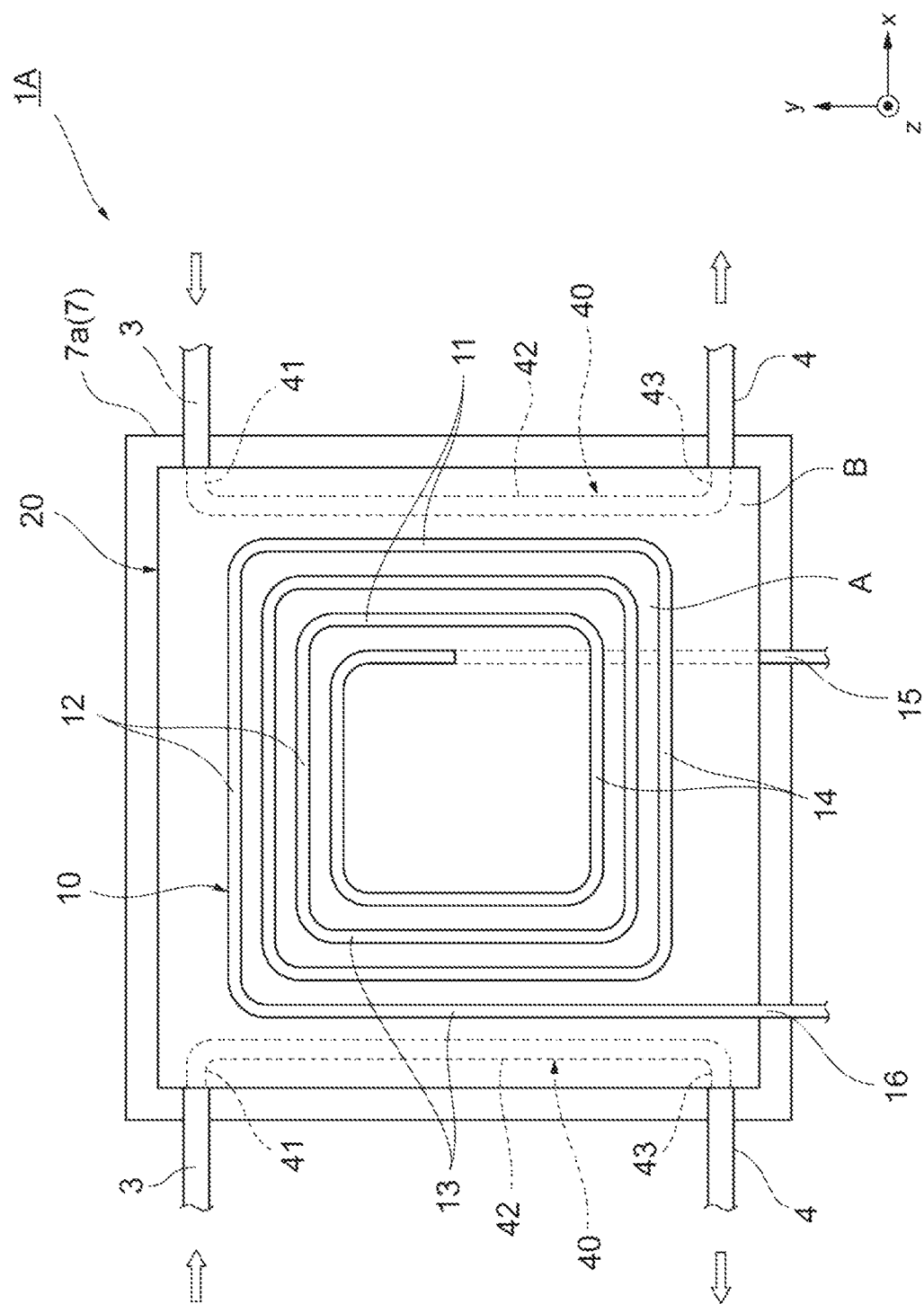
FIG. 4 is a plan view of a coil device according to a second embodiment of this disclosure.

A coil device 1A according to a second embodiment will be described with reference to FIG. 4. In FIG. 4, illustration of the cover 7b is omitted. The cooling flow path 30 of the first embodiment is provided in the second region B to surround the first region A. In the present embodiment, the coil device 1A includes two cooling flow paths 40. In a second region B, the cooling flow paths 40 are provided on a first extending portion 11 side and a third extending portion 13 side, respectively. The coil device 1A is different from the coil device 1 in this point.

Each of the cooling flow paths 40 is a substantially U-shaped flow path. Specifically, the cooling flow path 40 on the first extending portion 11 side includes a straight portion 42 extending along a first extending portion 11 located on an outermost side, an inflow portion 41 extending from one end of the straight portion 42 toward an edge of a holding member 20 on the first extending portion 11 side, and an outflow portion 43 extending from the other end of the straight portion 42 toward the edge of the holding member 20 on the first extending portion 11 side. The cooling flow path 40 on the third extending portion 13 side includes a straight portion 42 extending along a third extending portion 13 located on an outermost side, an inflow portion 41 extending from one end of the straight portion 42 toward an edge of a holding member 20 on the third extending portion 13 side, and an outflow portion 43 extending from the other end of the straight portion 42 toward the edge of the holding member 20 on the third extending portion 13 side. Each inflow portion 41 leads to one end portion of a supply pipe 3, and each outflow portion 43 leads to one end portion of a discharge pipe 4. By this configuration, a cooling fluid flowing in from the inflow portion 41 flows out from the outflow portion 43 through the straight portion 42.

In the present embodiment, it is possible to achieve the same effects as those of the first embodiment. In more detail, heat generated in a conductive wire 10 is directly transmitted to the cooling fluid in the cooling flow path 40 through the holding member 20. As a result, it is possible to improve cooling efficiency of the conductive wire 10. In addition, the cooling flow path 40 is provided in the second region B as in the first embodiment. For this reason, a temperature gradient is generated between a first region A and the second region B. Due to this temperature gradient, the heat of the conductive wire 10 is smoothly transmitted to the cooling fluid. In this way, it is possible to reliably improve cooling efficiency of the conductive wire 10.

In the present embodiment, the cooling flow path 40 is provided on each of the first extending portion 11 side and the third extending portion 13 side in the second region B. However, the invention is not limited thereto. For example, the cooling flow path 40 may be provided at any position in the second region B.

Third Embodiment

Figure 5:
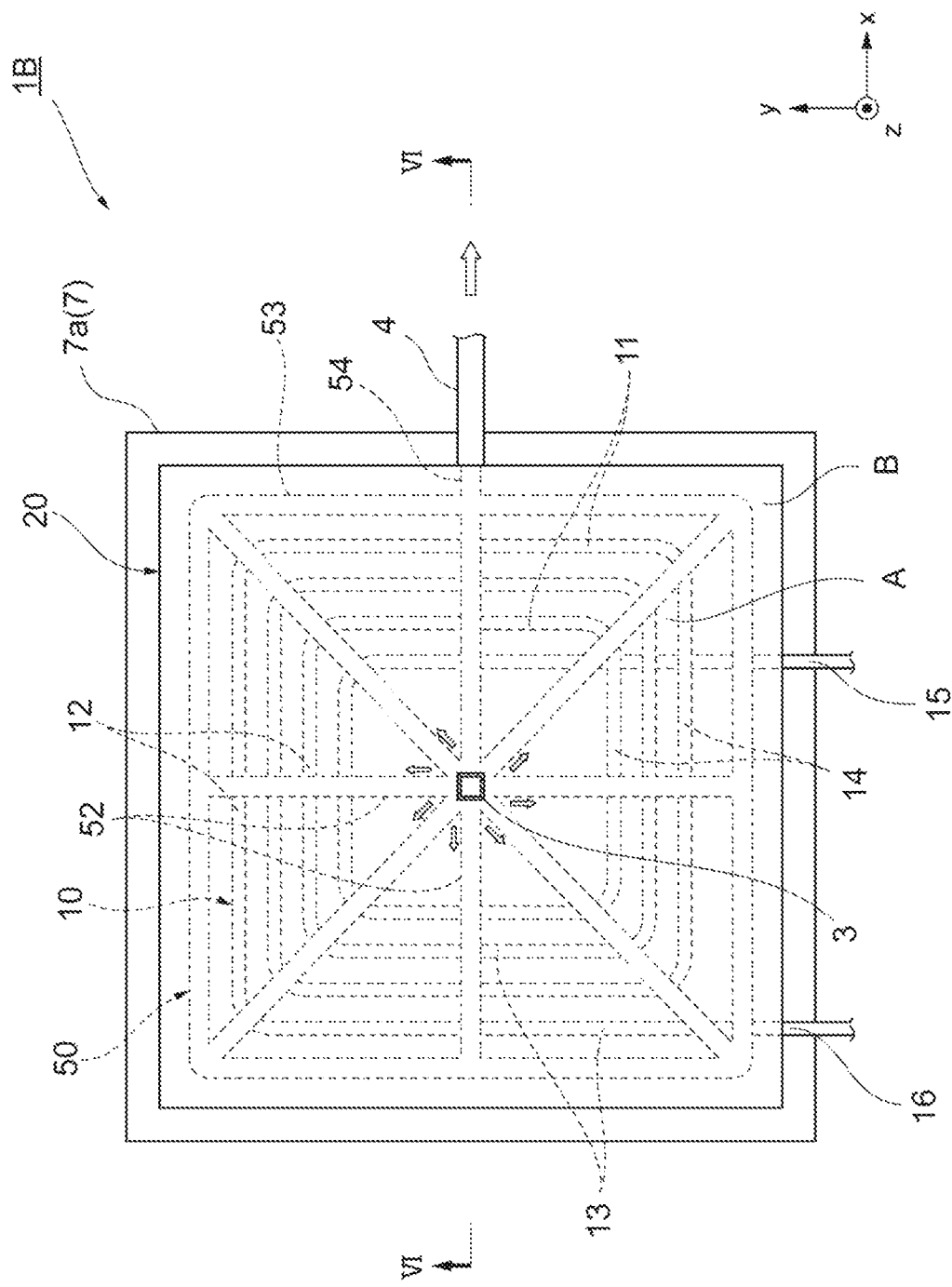
FIG. 5 is a plan view of a coil device according to a third embodiment of this disclosure.
Figure 6:
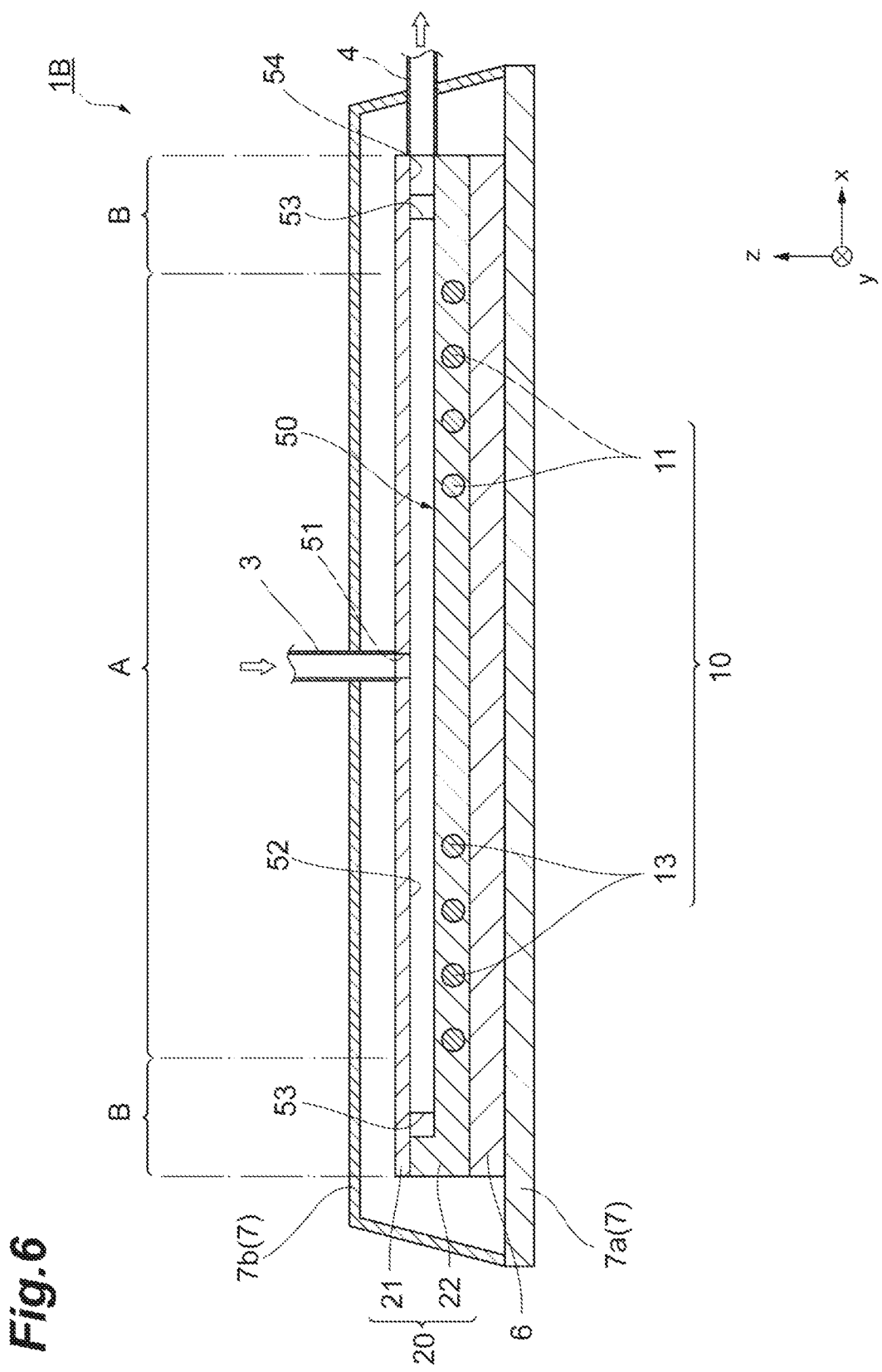
FIG. 6 is a cross-sectional view taken along VI-VI line of FIG. 5.

A coil device 1B according to a third embodiment will be described with reference to FIG. 5 and FIG. 6. In FIG. 5, illustration of the cover 7b is omitted. The cooling flow path 30 of the first embodiment is located in the second region B to surround the first region A. However, a cooling flow path 50 of the present embodiment extends from a center portion of a first region A to a second region B. The center portion of the first region A refers to a region surrounded by respective extending portions 11, 12, 13, and 14 located on innermost sides, and an outer periphery of the first region A refers to a region other than the center region in the first region A. In addition, while the conductive wire 10 of the first embodiment is accommodated in the groove 21a which is open to the front surface side of the upper member 21, for example, a conductive wire 10 of the present embodiment is incorporated in the upper member 21 by insert molding, and is not exposed from a holding member 20. The coil device 1B is different from the coil device 1 in this point.

The cooling flow path 50 is a flow path that leads from a front surface (upper surface) of the holding member 20 to a side surface through the inside. The cooling flow path 50 includes a radiating portion 52 spreading in a planar radial shape substantially parallel to the front surface of the holding member 20 on the conductive wire 10 inside the holding member 20, a frame-shaped outer periphery 53 surrounding each distal end of the radiating portion 52 inside the holding member 20, an inflow portion 51 extending from a center portion of the radiating portion 52 to the front surface of the holding member 20, and an outflow portion 54 laterally extending from the outer periphery 53 to an end surface of the holding member 20. Each straight line part radially extending from the center portion of the radiating portion 52 extends from the center portion of the first region A to the second region B.

More specifically, the inflow portion 51 is a through-hole provided at a center portion of the upper member 21. The inflow portion 51 leads to one end portion of a supply pipe 3. The radiating portion 52, the outer periphery 53, and the outflow portion 54 are formed by grooves provided on a front surface side of a lower member 22 and a rear surface portion of the upper member 21 closing open portions of the grooves on the front surface side. The outflow portion 37 leads to one end portion of a discharge pipe 4.

In the present embodiment, it is possible to achieve the same effects as those of the first embodiment. In more detail, heat generated in the conductive wire 10 is directly transmitted to a cooling fluid in the cooling flow path 50 through the holding member 20. As a result, it is possible to improve cooling efficiency of the conductive wire 10.

In addition, in the present embodiment, the cooling flow path 50 extends from the center portion of the first region A to the second region B. More specifically, each straight line part radially spreading from the center portion of the radiating portion 52 extends from the center portion of the first region A to the second region B. Heat is easily trapped and a temperature is prone to rise in the center portion of the first region A. For this reason, when the cooling fluid is supplied from the center portion side of the first region A, it is possible to cool the center portion of the first region A, which is likely to rise in temperature, while cooling capacity of the cooling fluid is high. Therefore, cooling efficiency of the conductive wire 10 can be further improved. The outer periphery of the first region A is less likely to rise in temperature than the center portion of the first region A. For this reason, the outer periphery of the first region A may be sufficiently cooled even using the cooling fluid passing through the center portion of the first region A.

A circulation direction of the cooling fluid may be appropriately changed according to a temperature distribution of the holding member 20. For example, when the outer periphery of the first region A is more likely to rise in temperature than the center portion of the first region A due to a winding manner, etc. of the conductive wire 10, the cooling fluid may be supplied from the outflow portion 54, and the cooling fluid may be discharged from the inflow portion 51.

Fourth Embodiment

Figure 7:
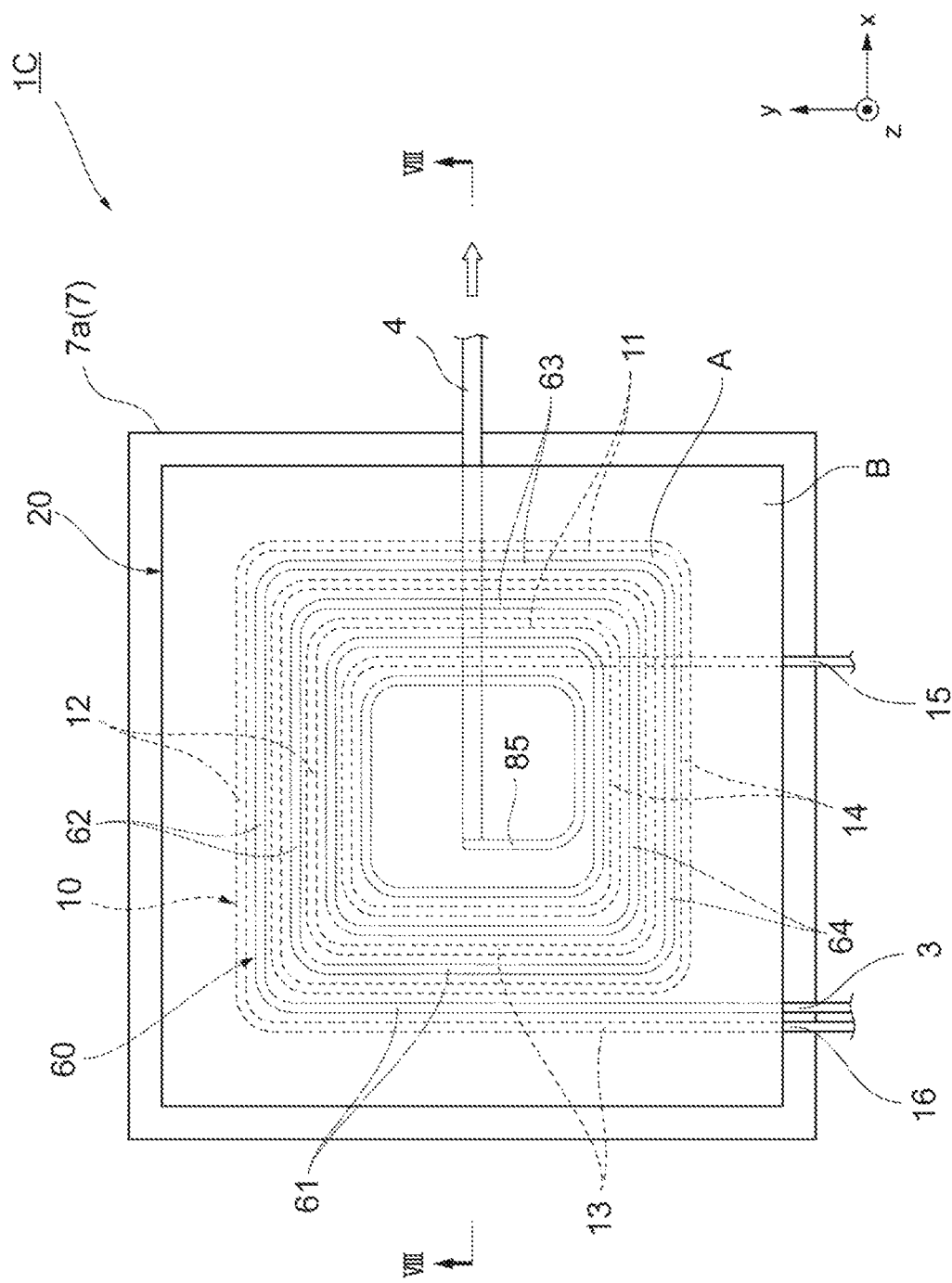
FIG. 7 is a plan view of a coil device according to a fourth embodiment of this disclosure.
Figure 8:
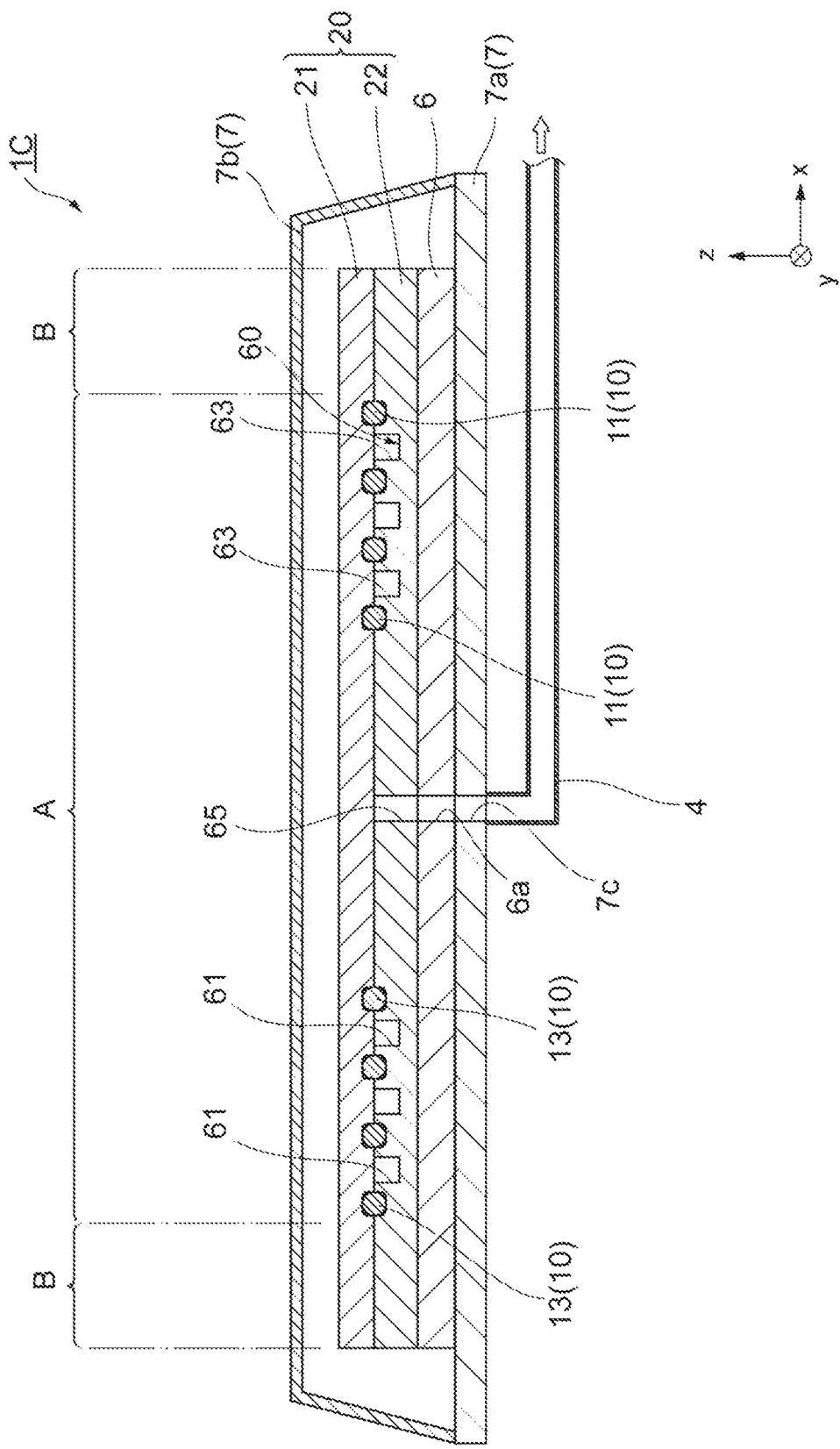
FIG. 8 is a cross-sectional view taken along VIII-VIII line of FIG. 7.

A coil device 1C according to a fourth embodiment will be described with reference to FIG. 7 and FIG. 8. In FIG. 7, illustration of the cover 7b is omitted. The cooling flow path 30 of the first embodiment is located in the second region B to surround the first region A. However, the cooling flow path 60 of the present embodiment is provided in each of a part between adjacent first extending portions 11, a part between adjacent second extending portions 12, a part between adjacent third extending portions 13, and a part between adjacent fourth extending portions 14. In addition, while the conductive wire 10 of the first embodiment is accommodated in the groove 21a which is open to the front surface side of the upper member 21, a conductive wire 10 of the present embodiment is covered with a groove which is open to a rear surface side of an upper member 21 and open to a front surface side of a lower member 22 at a position facing the groove. For this reason, the conductive wire 10 is incorporated in a holding member 20 and is not exposed from the holding member 20. The coil device 1C is different from the coil device 1 in this point.

The cooling flow path 60 is provided in a planar spiral shape substantially in parallel with a surface of the holding member 20 inside the holding member 20. For example, the cooling flow path 60 is wound in a substantially rectangular shape. More specifically, the cooling flow path 60 includes a plurality of first straight portions 61, a plurality of second straight portions 62, a plurality of third straight portions 63, a plurality of fourth straight portions 64, and an outflow portion 65. For example, the first straight portions 61, the second straight portions 62, the third straight portions 63, and the fourth straight portions 64 are formed straight lines, and included in respective parts of a circumference of the cooling flow path 60 by being continued in order. Bent portions curved substantially at right angles are provided between the first straight portions 61 and the second straight portions 62, between the second straight portions 62 and the third straight portions 63, and between the third straight portions 63 and the fourth straight portions 64, respectively. The first straight portions 61 extend between the adjacent third extending portions 13, the second straight portions 62 extend between the adjacent second extending portions 12, the third straight portions 63 extend between the adjacent first extending portions 11, and the fourth straight portions 64 extend between the adjacent fourth extending portions 14.

For example, a first straight portion 61 located on an outermost side extends up to an end surface of the fourth extending portions 14 in the holding member 20. This first straight portion 61 leads to one end portion of a supply pipe 3. A third straight portion 63 located on an innermost side leads to the outflow portion 65. The outflow portion 65 extends up to a center portion of a first region A in the holding member 20. The outflow portion 65 leads to a discharge pipe 4 located below a base 7a through a hole 6a located at a center portion of a magnetic member 6 and a hole 7c located at a center portion of the base 7a. The first straight portions 61, the second straight portions 62, the third straight portions 63, the fourth straight portions 64, and the outflow portion 65 are formed by grooves provided on the lower member 22 and a rear surface portion of the upper member 21 closing open portions of the grooves on a front surface side.

In the present embodiment, it is possible to achieve the same effects as those of the first embodiment. In more detail, heat generated in the conductive wire 10 is directly transmitted to a cooling fluid in the cooling flow path 60 through the holding member 20. As a result, it is possible to improve cooling efficiency of the conductive wire 10.

In addition, the cooling flow path 60 is provided in each of the part between the adjacent first extending portions 11, the part between the adjacent second extending portions 12, the part between the adjacent third extending portions 13, and the part between the adjacent fourth extending portions 14. By this configuration, even when the cooling flow path 60 is provided only in the second region B, since a distance between the conductive wire 10 and the cooling flow path 60 in the first region A (a length of a heat transfer path) becomes short, it is possible to further improve cooling efficiency of the conductive wire 10.

The cooling flow path 60 may be provided in at least one of the part between the adjacent first extending portions 11, the part between the adjacent second extending portions 12, the part between the adjacent third extending portions 13, and the part between the adjacent fourth extending portions 14.

Fifth Embodiment

Figure 9:
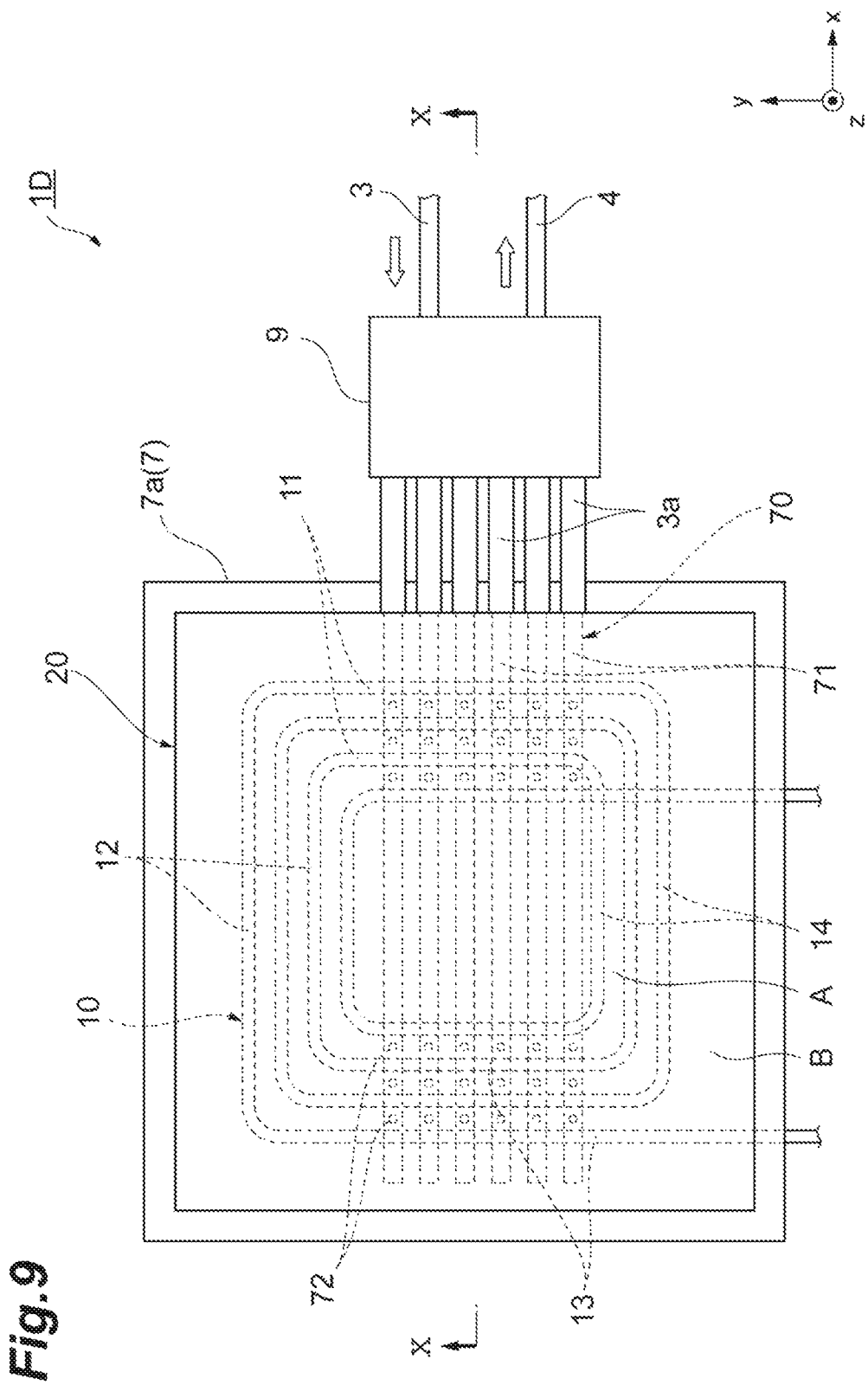
FIG. 9 is a plan view of a coil device according to a fifth embodiment of this disclosure.
Figure 10:
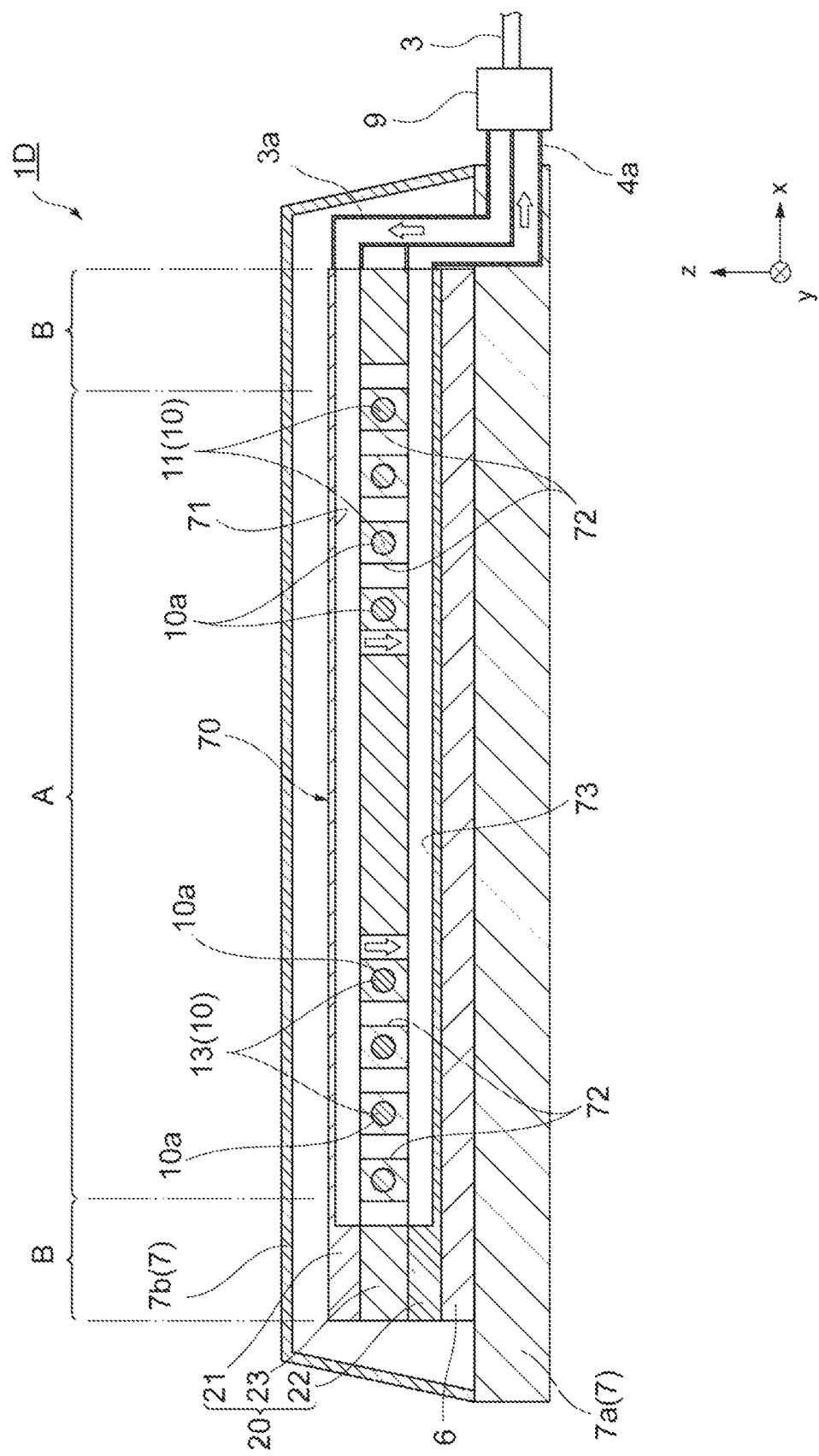
FIG. 10 is a cross-sectional view taken along X-X line of FIG. 9.

A coil device 1D according to a fifth embodiment will be described with reference to FIG. 9 and FIG. 10. In FIG. 9, illustration of the cover 7b is omitted. The cooling flow path 30 of the first embodiment is located in the second region B to surround the first region A. However, a cooling flow path 70 of the present embodiment is provided to surround an outer circumferential surface 10a of each of extending portions 11, 12, 13, and 14. In addition, the conductive wire 10 of the first embodiment is accommodated in the groove 21a which is open to the front surface side of the upper member 21. A holding member 20 of the present embodiment further includes an intermediate member 23 between an upper member 21 and a lower member 22. For example, a conductive wire 10 is incorporated in the intermediate member 23 by insert molding. In other words, the conductive wire 10 is not exposed from the holding member 20. The coil device 1D is different from the coil device 1 in this point.

The cooling flow path 70 is located inside the holding member 20. Specifically, the cooling flow path 70 includes a plurality of inflow portions 71 located above the conductive wire 10, a plurality of relay portions 72, each of which is located on a side of the conductive wire 10, and a plurality of outflow portions 73 located below the conductive wire 10. The inflow portions 71, the relay portions 72, and the outflow portions 73 are continued in order.

The plurality of inflow portions 71 substantially horizontally (direction X) extends in a straight line shape from a top of the first extending portion 11 toward a top of the third extending portion 13, and is provided at a predetermined interval along an extending direction (direction Y) of the first extending portion 11 and the third extending portion 13. The plurality of relay portions 72 substantially vertically (vertical direction Z) extends downward from the inflow portions 71 by passing through between adjacent first extending portions 11 and between adjacent third extending portions 13. The outflow portions 73 substantially horizontally (direction X) extend in a straight line shape from under the first extending portion 11 toward under the third extending portion, and are provided at a predetermined interval along the extending direction (direction Y) of the first extending portion 11 and the third extending portion 13. In this way, respective outer circumferential surfaces 10a of the first extending portions 11 and the third extending portions 13 are surrounded by the inflow portions 71, the relay portions 72, and the outflow portions 73.

Each of the inflow portions 71 is formed by a linear groove provided on the upper member 21 and a front surface portion of the intermediate member 23 closing an open portion of the groove on a rear surface side. The plurality of relay portions 72 corresponds to through-holes having a predetermined diameter in a thickness direction of the intermediate member 23. Each of the outflow portions 73 is formed by a linear groove provided on the lower member 22 and a rear surface portion of the intermediate member 23 closing an open portion of the groove on a front surface side.

The plurality of inflow portions 71 leads to one end portions of a plurality of branch passages 3a, and the plurality of outflow portions 73 leads to one end portions of a plurality of branch passages 4a. The branch passages 3a and 4a are exposed to the outside of a housing 7 by penetrating a base 7a. The branch passages 3a leads to a supply pipe 3 through a connector 9 on the outside of the housing 7, and the branch passages 4a leads to a discharge pipe 4 through the connector 9 on the outside of the housing 7.

In the present embodiment, it is possible to achieve the same effects as those of the first embodiment. In more detail, heat generated in the conductive wire 10 is directly transmitted to a cooling fluid in the cooling flow path 70 through the holding member 20. As a result, it is possible to improve cooling efficiency of the conductive wire 10.

In addition, the cooling flow path 70 is provided to surround the outer circumferential surface 10a of each of the extending portions 11 and 13. By this configuration, the cooling fluid flows around the conductive wire 10. For this reason, the heat of the conductive wire 10 is transmitted toward a periphery of the conductive wire 10. Therefore, it is possible to further improve cooling efficiency of the conductive wire 10.

In the present embodiment, the cooling flow path 70 is provided to surround the outer circumferential surface 10a of each of the extending portions 11 and 13. However, the cooling flow path 70 may be provided to surround the outer circumferential surfaces 10a of all the extending portions 11, 12, 13, and 14. Alternatively, the cooling flow path 70 may be provided to surround at least one extending portion (furthermore, only a part of the extending portion).

In the present embodiment, it is presumed that each of the relay portions 72 has the predetermined diameter. However, for example, in the respective relay portions 72, a relay portion 72 closer to the branch passages 3a may have a smaller diameter, and a relay portion 72 farther from the branch passages 3a may have a larger diameter. By this configuration, flow rates of the cooling fluid flowing into the respective relay portions 72 may be equalized. As a result, it is possible to suppress a position variation of cooling efficiency of the conductive wire 10.

The first to fifth embodiments of this disclosure have been described above. However, the invention is not limited to the above embodiments.

Figure 11:
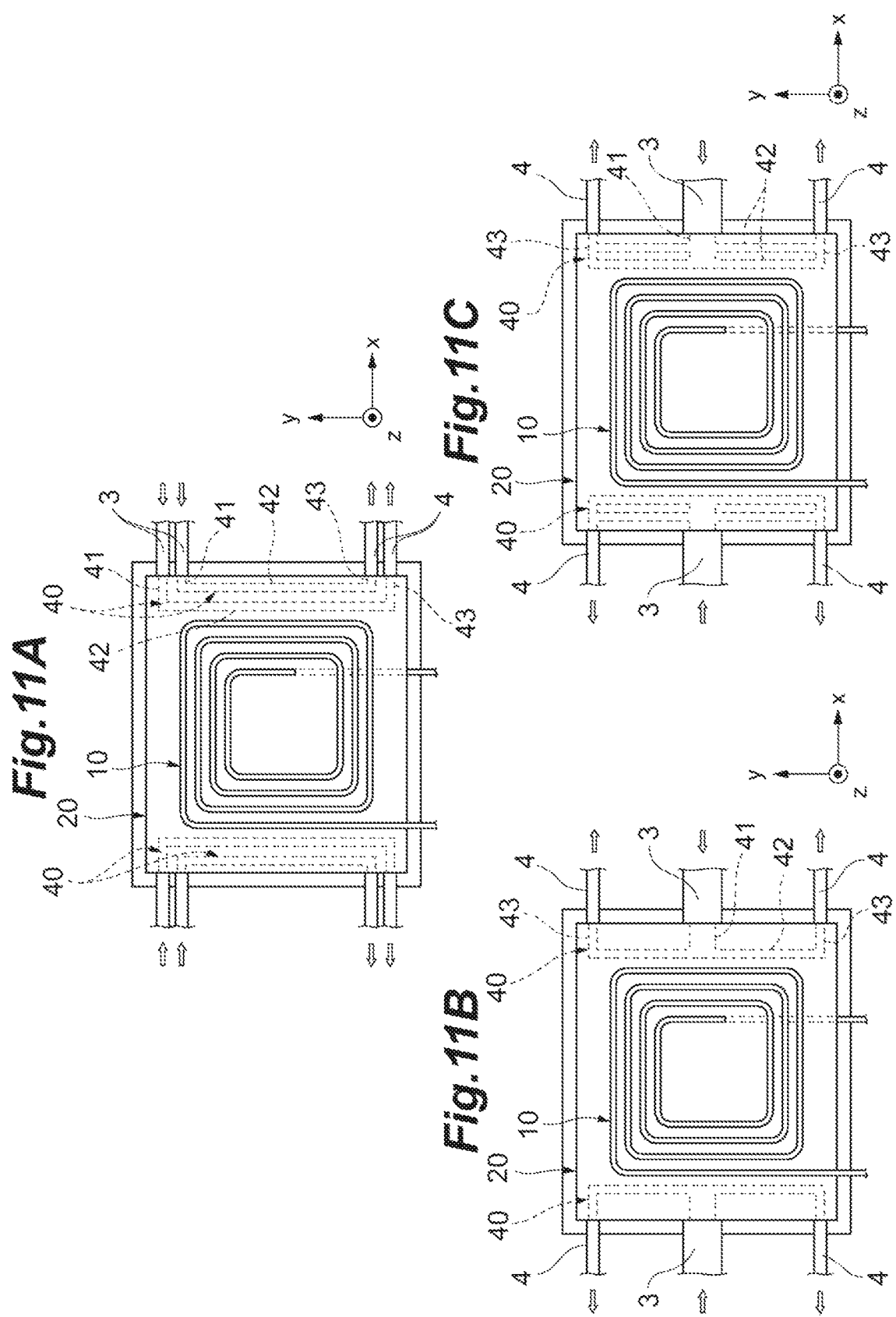
FIG. 11A, FIG. 11B, and FIG. 11C are plan views of modifications of the coil device of FIG. 4, respectively.

In the second embodiment (see FIG. 4), in the second region B, the cooling flow paths 40 are provided on the first extending portion 11 side and the third extending portion 13 side, respectively. However, for example, as illustrated in FIG. 11A, the cooling flow path 40 on the first extending portion 11 side may be doubly arranged in parallel, and the cooling flow path 40 on the third extending portion 13 side may be doubly arranged in parallel. By this configuration, it is possible to further improve cooling efficiency of the conductive wire 10.

In the second embodiment, the cooling flow path 40 includes the inflow portion 41 located on one end side of the straight portion 42 and the outflow portion 43 located on the other end side of the straight portion 42. However, for example, as illustrated in FIG. 11B, the inflow portion 41 may be provided at a center portion of the straight portion 42, and two outflow portions 43 may be provided at respective ends of the straight portion 42. By this configuration, a distance from the inflow portion 41 to the outflow portion 43 is about half when compared to the case of the second embodiment. Therefore, the cooling fluid may maintain high cooling capacity around the outflow portion 43.

The cooling flow path 40 may include a plurality of flow path portions having different flow path diameters. Specifically, as illustrated in FIG. 11B, a flow path diameter of the straight portion 42 may be smaller than a flow path diameter of the inflow portion 41. In a region in which the temperature of the holding member 20 is likely to rise (a region close to the conductive wire 10), the flow path diameter of the straight portion 42 may be decreased to increase a flow speed of the cooling fluid, thereby improving cooling efficiency of the conductive wire 10. On the other hand, in a region in which the temperature of the holding member 20 rarely rises (a region far from the conductive wire 10), the flow path diameter of the inflow portion 41 may be increased to reduce a pressure loss of the cooling flow path 40, thereby guaranteeing smooth circulation of the cooling fluid.

As illustrated in FIG. 11C, in the cooling flow path 40 of FIG. 11B, the straight portion 42 may be doubly arranged in parallel. That is, two straight portions 42 may be extended from one outflow portion 43 to the other outflow portion 43. The inflow portion 41 leads to both the two straight portions 42 at center portions of the respective straight portions 42. By this configuration, it is possible to further improve cooling efficiency of the conductive wire 10.

Only modifications of the second embodiment have been described above. However, technical ideas thereof are not limited to the second embodiment, and may be applied to other embodiments described above.

In the first and second embodiments, the upper member 21 and the lower member 22 have the two-layer structure. However, for example, the holding member 20 may have a two-layer structure only in the second region B. In this case, for example, the lower member is a member including a rectangular flat plate-shaped main body and a rectangular protrusion protruding from a center portion of the main body. The upper member is a rectangular frame-shaped member surrounding a side portion of the protrusion.

In the above embodiments, the circular type coil portion 2 is adopted. However, the invention is not limited thereto. For example, it is possible to adopt a solenoid coil portion in which a conductive wire is spirally wound in a three-dimensional spatial manner. In this case, a shape of the holding member that holds the conductive wire may correspond to any one of a flat square tubular shape, a cylindrical shape, an elliptic cylindrical shape, etc.

In the above embodiments, the pump 5 is provided to forcibly cause the cooling fluid to flow. However, a water head difference, etc. may be used, and the pump 5 may not be provided. A dedicated power line may be drawn as a power supply of the pump 5, and power of wireless power transfer may be used. Since the pump 5 needs to be rotated only when heat is generated, that is, during power feeding, it is efficient to drive the pump 5 in accordance with power feeding.

In the above embodiments, the supply pipe 3, the discharge pipe 4, and the cooling flow path provided in the holding member form the circulation flow path for circulating the cooling fluid. However, the supply pipe 3, the discharge pipe 4, and the cooling flow path may form a flow path through which the cooling fluid does not circulate. The cooling flow path is not limited to the above-described configurations of the respective embodiments, and may have any configuration as long as the cooling flow path is provided in the holding member.

When a coil device installed in the vehicle is cooled, a coolant for cooling of a vehicle (for example, an engine) may be used as the cooling fluid. When a coil device installed in an underwater movable object is cooed, water (sea water) present around the underwater movable object may be taken in. A temperature may be intentionally adjusted by adjusting cooling capacity in accordance with a misalignment, etc. between coil devices, thereby approaching a coil characteristic suitable for power feeding.

It is possible to provide a Peltier element including two metal plates, and a metal electrode and a semiconductor provided therebetween. In this case, one metal plate is brought into contact with a cooling flow path of a coil device on a power transmission side. Then, heat from a cooling fluid absorbing heat is transmitted to the one metal plate. The other metal plate is exposed to a surrounding environment. By this configuration, a temperature difference is created between the two metal plates, and power generation using the Seebeck effect is performed. Therefore, thermal energy may be converted into electric energy, and energy may be efficiently used.

In the above embodiments, a description has been given of a case in which the coil device of this disclosure is applied to the wireless power transfer system. However, the application is not limited to the wireless power transfer system. For example, the coil device of this disclosure may be applied to an inductive heating system or an eddy current flaw detecting system.

In the above embodiments, a description has been given of a case in which the cooling flow path leads to the outside of the housing. However, the invention is not limited thereto. The cooling flow path may be provided inside the housing. The cooling flow path may be configured to circulate the cooling fluid inside the housing. For example, each component illustrated in FIG. 1 may be provided inside the housing.

Sixth Embodiment

A wireless power transfer system (coil system) 101 according to a sixth embodiment will be described with reference to FIG. 12. The wireless power transfer system 101 is a system for charging a battery mounted in a vehicle such as an electric vehicle, a hybrid vehicle, etc.

Figure 12:
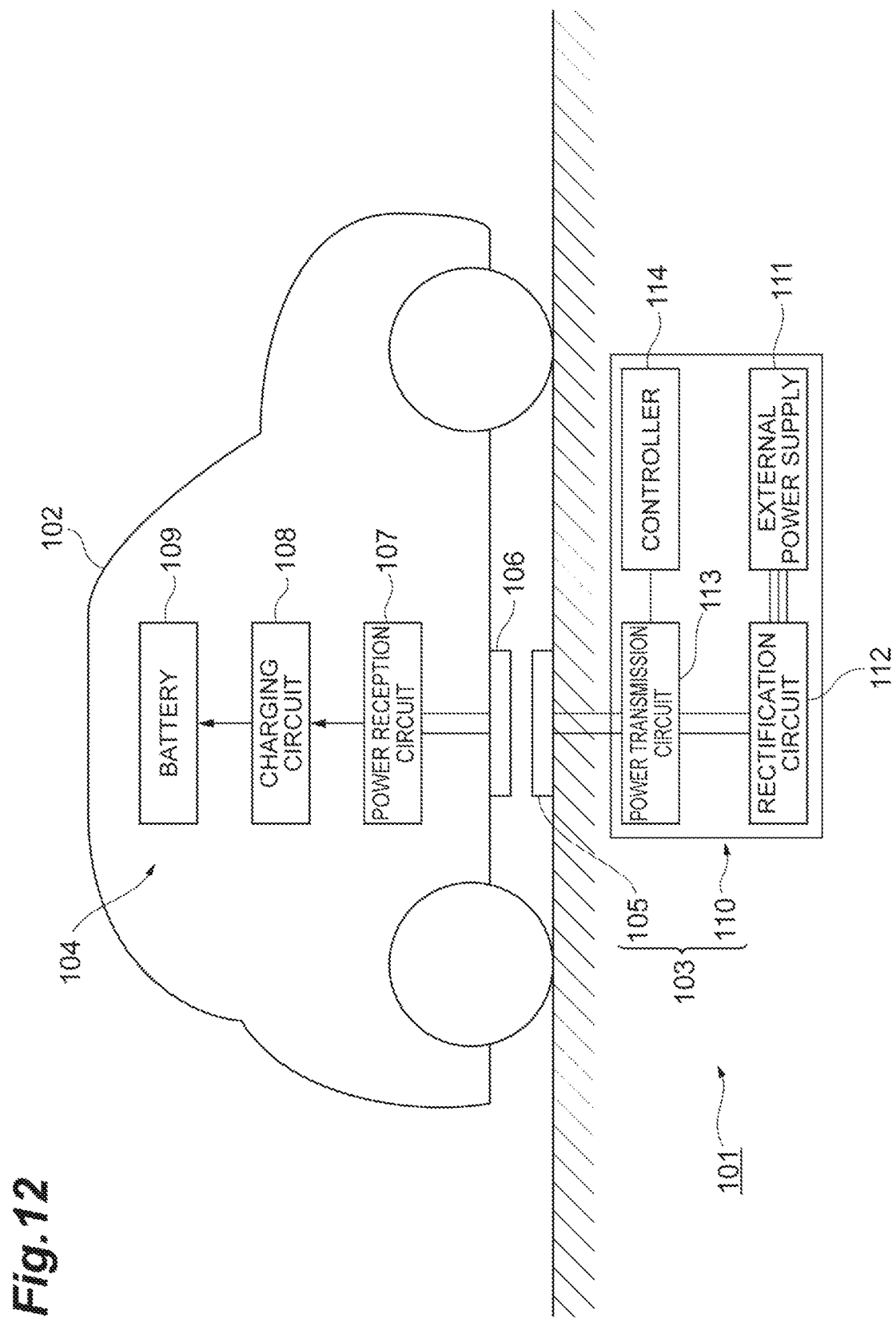
FIG. 12 is a block diagram illustrating a configuration of a coil system according to a sixth embodiment of this disclosure.

As illustrated in FIG. 12, the wireless power transfer system 101 includes a power transmitter 103 installed on a ground surface and a power receiver 104 provided on a side of a vehicle 102. When the vehicle 102 traveling on the ground stops at a predetermined position (a position at which an electromagnetic coupling circuit described below is formed), the power transmitter 103 wirelessly transmits power (power for charging a battery 109) to the power receiver 104 of the vehicle 102.

The power transmitter 103 includes a coil device 105 on a power transmission side and a power supply unit 110 connected to the coil device 105. The coil device 105 is installed on the ground surface. The power supply unit 110 includes an external power supply 111, a rectification circuit 112, a power transmission circuit 113, and a controller 114. The external power supply 111 is a power supply for supplying power necessary for generating power to be transmitted to the vehicle 102. For example, the external power supply 111 is a power supply that supplies single-phase AC power such as a commercial AC power supply. The external power supply 111 is not limited to a single-phase AC power source, and may correspond to a power supply that supplies three-phase AC power.

The rectification circuit 112 is a circuit that rectifies AC power supplied from the external power supply 111 and converts the rectified power into DC power. The rectification circuit 112 may have a power factor correction (PFC) function or a step-up/step-down function. A DC power source such as a fuel cell, a solar cell, etc. may be used as the external power supply 111. In this case, the rectification circuit 112 may be omitted. In addition, when the external power supply 111 corresponds to the DC power source, a DC conversion circuit (DC/DC converter) may be provided instead of the rectification circuit 112.

The power transmission circuit 113 wirelessly supplies power supplied from the rectification circuit 112 to the vehicle 102 through an electromagnetic coupling circuit formed by the coil device 105 on the power transmission side and a coil device 106 on a power reception side provided on the vehicle 102. For example, the power transmission circuit 113 includes an inverter circuit to invert DC power from the rectification circuit 112 into AC power having a higher frequency than that of the AC power of the external power supply 111 (radio frequency power) and transmits the inverted AC power to the coil device 105 on the power transmission side. In this way, wireless power transfer is performed between the coil device 105 on the power transmission side and the coil device 106 on the power reception side. The power transmission circuit 113 may include a resonance capacitor forming a power transmission side resonance circuit together with a coil portion 120 (see FIG. 13) included in the coil device 105 on an output side of the inverter circuit.

For example, the controller 114 is an electronic control unit including a central processing unit (CPU), a read only memory (ROM), a random access memory (RAM), etc. The controller 114 controls power supply from the coil device 105 on the power transmission side to the coil device 106 on the power reception side. The controller 114 controls each circuit (the power transmission circuit 113, etc.) of the power supply unit 110 to change the magnitude of power supplied from the coil device 105 on the power transmission side to the coil device 106 on the power reception side. For example, in a case in which an abnormality occurs in a circuit on the power reception side (at least one of the coil device 106, a power reception circuit 107, and a charging circuit 108) or the battery 109, etc., the controller 114 may perform a control operation to suspend power supply from the coil device 105 on the power transmission side to the coil device 106 on the power reception side.

In addition, the controller 114 controls the inverter circuit of the power transmission circuit 113 such that a frequency of a current supplied to the coil device 105 on the power transmission side is switched between a first frequency for wireless power transfer and a second frequency lower than the first frequency. The first frequency is a frequency for appropriately performing wireless power transfer between the coil device 105 and the coil device 106. For example, the first frequency is determined taking into account circumstances such as law regulation, etc. For example, the first frequency is about 100 kHz. The second frequency may correspond to a low frequency at which magnetic powder easily responds (easily moves). For example, the second frequency may correspond to about several tens Hz to several kHz. The controller 114 controls the power transmission circuit 113 such that the frequency of the current supplied to the coil device 105 is set to the first frequency in principle during wireless power transfer, and the frequency is switched to the second frequency, for example, only in a predetermined time at predetermined timing. For example, the predetermined time corresponds to about one second. For example, the predetermined timing corresponds to a time at which the coil device 105 reaches a predetermined temperature.

An electromagnetic coupling circuit is formed due to the coil device 105 and the coil device 106 approaching each other, and the coil portion 120 (see FIG. 13) included in the coil device 105 and a coil portion 140 (see FIG. 13) included in the coil device 106 are positioned close to each other. This electromagnetic coupling circuit refers to a circuit in which the coil portions 120 and 140 are electromagnetically coupled to each other to perform wireless power feeding from the coil portion 120 on the power transmission side to the coil portion 140 on the power reception side. The electromagnetic coupling circuit may correspond to a circuit that performs power feeding using an "electromagnetic induction scheme" or a circuit that performs power feeding using a "magnetic resonance scheme".

The vehicle 102 includes the power receiver 104. The vehicle 102 includes components necessary for traveling such as an electric motor, an operation handle, a brake, etc. In FIG. 12, illustration of these components is omitted. The power receiver 104 includes the coil device 106, the power reception circuit 107, and the charging circuit 108. The coil device 106 receives power (AC power) wirelessly supplied from the coil device 105 on the power transmission side.

The power reception circuit 107 converts AC power from the coil device 106 into DC power and outputs the converted power to the charging circuit 108. The power reception circuit 107 may include a resonance capacitor included in a power reception side resonance circuit together with the coil portion 140 on the power reception side. The capacitance of the resonance capacitor of the power reception circuit 107 may be set such that a resonance frequency of the power reception side resonance circuit is the same as the resonance frequency of the power transmission side resonance circuit.

The charging circuit 108 has an input terminal connected to an output terminal of the power reception circuit 107 and an output terminal connected to an input terminal of the battery 109, and converts power (DC power) from the charging circuit 108 to desired power to supply the converted power to the battery 109. The battery 109 is a rechargeable battery (for example, a secondary battery such as a lithium ion battery, a nickel hydride battery, etc.) mounted on the vehicle 102, and supplies power to a traveling electric motor (not illustrated), etc. The charging circuit 108 is controlled based on a power reception control program prepared in advance by a power reception controller (not illustrated).

Next, the coil device 105 on the power transmission side and the coil device 106 on the power reception side will be described with reference to FIG. 13 and FIG. 14.

The coil device 105 on the power transmission side is installed on the ground surface. As illustrated in FIG. 13, the coil device 105 includes the coil portion 120 having a flat plate shape, a flat plate-shaped magnetic member 115 on which the coil portion 120 is placed, a housing 116 accommodating the coil portion 120 and the magnetic member 115, and a coolant 130 located inside the housing 116.

The coil portion 120 includes a conductive wire 121 and a holding member 122 that holds the conductive wire 121. For example, the holding member 122 has a rectangular flat plate shape. As illustrated in FIG. 14, the conductive wire 121 is wound in a planar spiral shape on a front surface side of the holding member 122. The conductive wire 121 is wound in a substantially rectangular shape. The coil portion 120 corresponds to a circular type coil portion. In the circular type coil portion 120, the conductive wire 121 may be wound in various shapes such as a rectangular shape, a circular shape, an elliptical shape, etc. when viewed in a direction of a winding axis (central axis) L1 of the wound conductive wire 121. For example, a single wire of copper or aluminum, a litz wire, a bus bar, etc. is used as the conductive wire 121.

The conductive wire 121 may correspond to the litz wire. In particular, in the wireless power transfer system, a current of a radio frequency (for example, kHz order or more) may be allowed to flow to the coil device 105 to achieve extension of a power transmission distance, an improvement in transmission efficiency, etc. In general, when a current flowing through the conductive wire 121 corresponds to a radio frequency, skin effect occurring in the conductive wire 121 becomes large. As the skin effect increases, resistance in the conductive wire 121 increases, and heat loss increases. The increase in heat loss leads to a decrease in power efficiency of the whole wireless power transfer system 101 (for example, a ratio of an battery 109 input on the power receiver 104 side to a power output on the power transmitter 103 side). The litz wire is used to suppress the skin effect. The litz wire is formed by twisting a plurality of conductor elements insulated from each other.

The conductive wire 121 includes a plurality of linear extending portions 121a and two lead-out portions 121b. Each of the plurality of extending portions 121a is included in four substantially rectangular-shaped sides forming each circumference of the conductive wire 121. A bent portion curved substantially at a right angle is provided between the respective extending portions 121a. The plurality of linear extending portions 121a is included in each circumference of the conductive wire 121 by being continued in order through the bent portion. Adjacent extending portions 121a forming a side on the same side are parallel to each other and have a predetermined interval. One of the lead-out portions 121b extends from a distal end of an extending portion 121a located on an innermost side to a rear surface side of the holding member 122 and is drawn to an outside of the holding member 122. The other one of the lead-out portions 121b extends from a distal end of an extending portion 121a located on an outermost side and is drawn to the outside of the holding member 122.

As described above, for example, the holding member 122 has a rectangular flat plate shape and holds the conductive wire 121 on the front surface side. The front surface of the holding member 122 faces the vehicle 102 (the coil device 106) side. A groove 122a for accommodating the conductive wire 121 is provided on the holding member 122. The groove 122a is open to the front surface side of the holding member 122. For example, the holding member 122 is made of a nonmagnetic and insulating material (polyphenylene sulfide resin, etc.).

The magnetic member 115 directs and aggregates lines of magnetic force generated from the coil portion 120. For example, the magnetic member 115 is a ferrite plate, etc.

Figure 13:
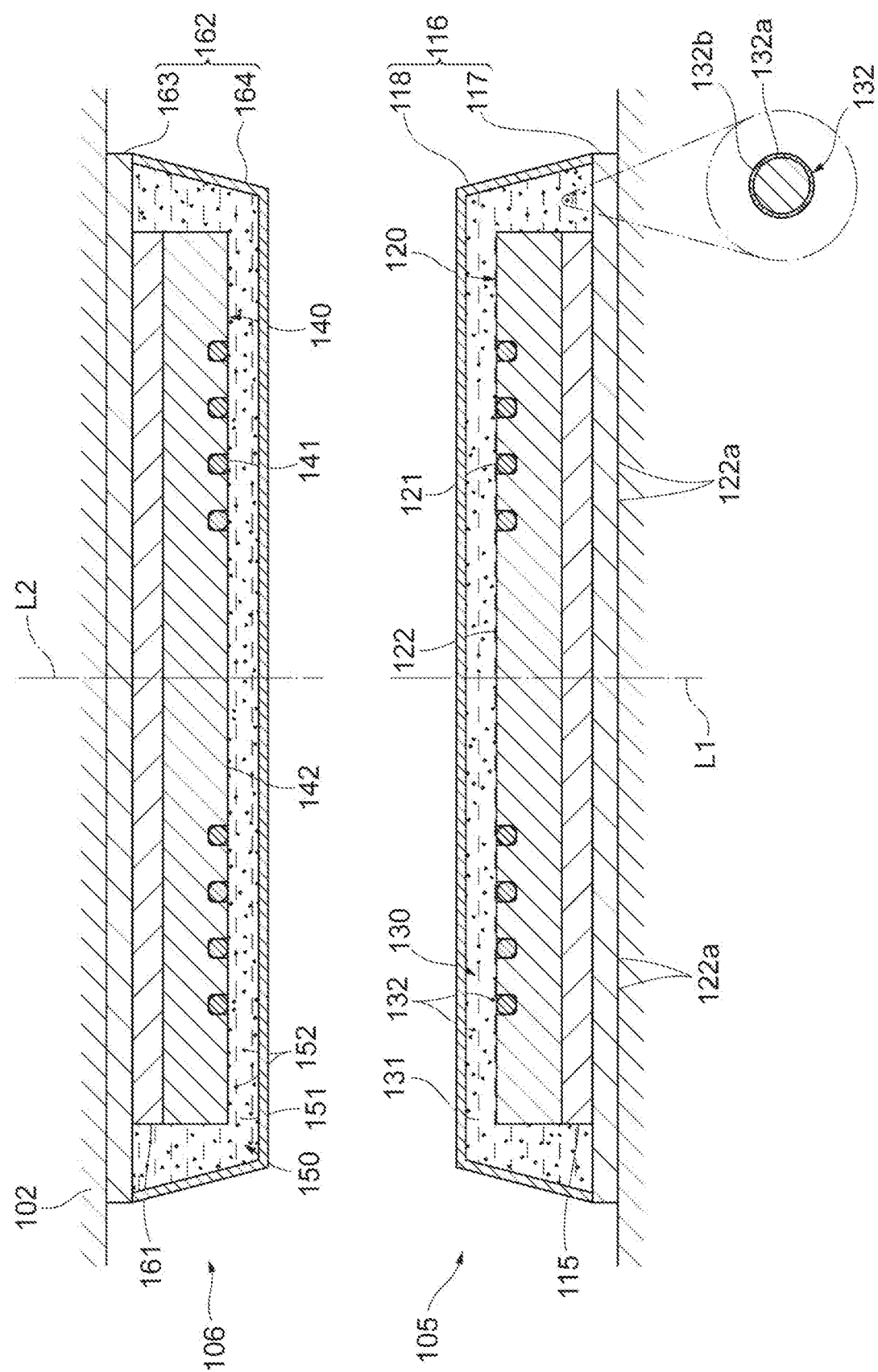
FIG. 13 is a side sectional view illustrating a coil device on a power transmission side and a coil device on a power reception side of FIG. 12.
Figure 14:
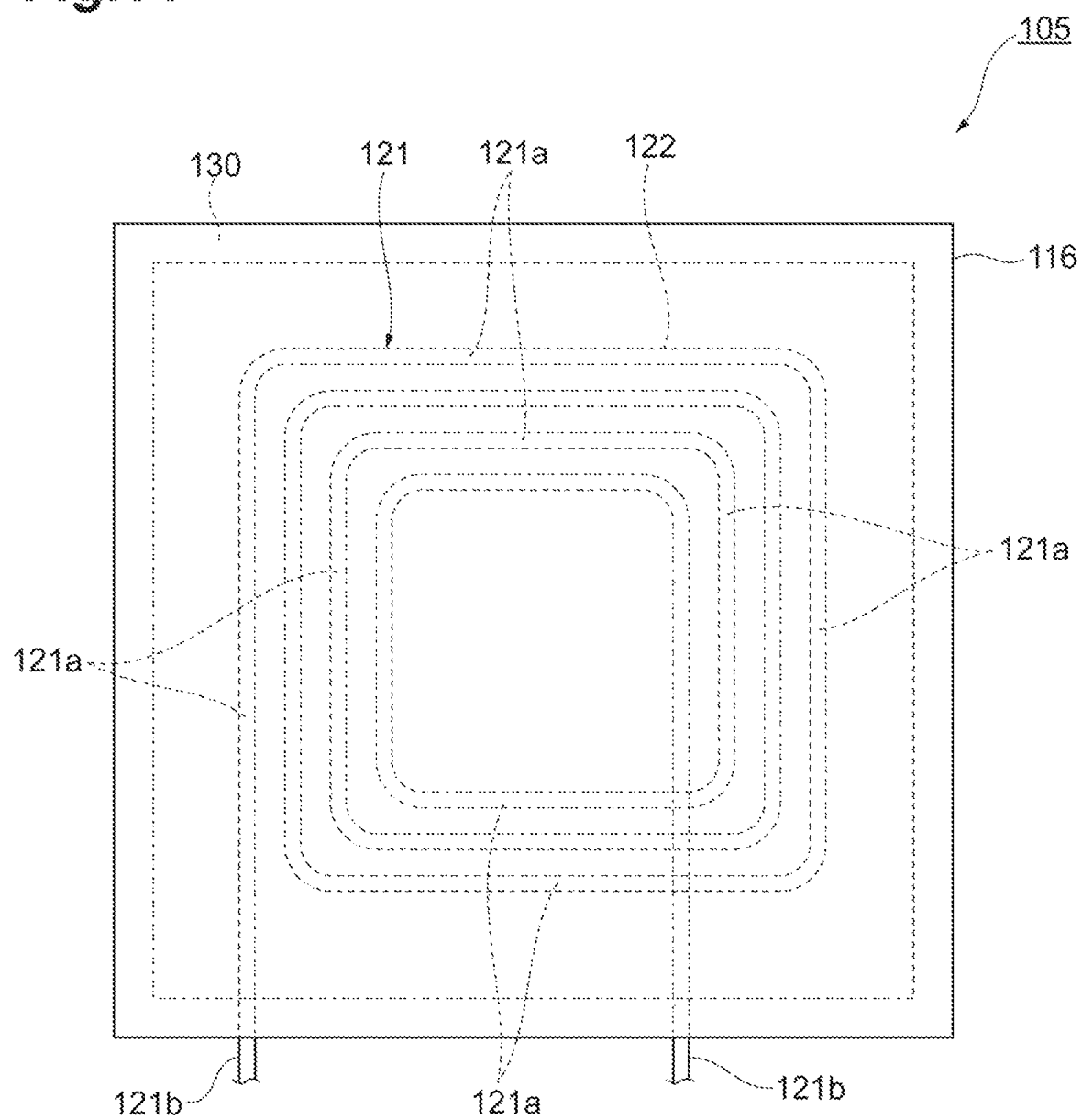
FIG. 14 is a plan view illustrating the coil device on the power transmission side of FIG. 12.

For example, the housing 116 has a shape of a flat rectangular parallelepiped, and includes a flat plate-shaped base 117 and a cover 118 that covers the coil portion 120 as illustrated in FIG. 13. The base 117 ensures strength of the coil device 105 and inhibits magnetic flux due to the coil portion 120 from leaking to a rear side of the base 117 (an opposite side from a side of the cover 118). The coil portion 120 is placed on the base 117 with the magnetic member 115 interposed therebetween. For example, the base 117 is made of a nonmagnetic and electrically conductive material (copper, aluminum, etc.). The cover 118 has an opening on the base 117 side, and an inner surface of the cover 118 faces a front surface and a side surface of the holding member 122 by being separated therefrom. For example, the cover 118 is made of a nonmagnetic and insulating material (polyphenylene sulfide resin, etc.). By a peripheral portion of the base 117 and a peripheral portion of the opening of the cover 118 being joined together, an accommodating space for the coil portion 120 and the magnetic member 115 is formed.

The coolant 130 has fluidity and thermal conductivity. In particular, the coolant 130 has a higher thermal conductivity than that of air. The higher thermal conductivity than that of air means that the thermal conductivity of the coolant 130 is higher than that of air when the thermal conductivities are measured in an environment of the same pressure and the same temperature. The coolant 130 is located between the housing 116 and the coil portion 120. More specifically, the coolant 130 is located inside a region surrounded by the inner surface of the cover 118 and the front surface and the side surface of the holding member 122. For example, the coolant 130 is sealed between the housing 116 and the coil portion 120 through a hole (not illustrated) provided in the cover 118. The coolant 130 is sealed between the housing 116 and the coil portion 120 at a capacity that allows smooth flow. The coolant 130 may be sealed (filled) in the entire region between the housing 116 and the coil portion 120 or sealed in a part thereof when the smooth flow is allowed.

The coolant 130 contains a cooling fluid 131 and magnetic powder 132 mixed in the cooling fluid 131. For example, the cooling fluid 131 may correspond to insulating oil. The insulating oil has extremely low electrical conductivity, and thus it is possible to suppress adverse influence on the conductive wire 121. The cooling fluid 131 is not limited thereto, and may correspond to a fluid having fluidity and thermal conductivity. For example, the cooling fluid 131 may correspond to a liquid such as water, liquid ammonia, etc. or a gas such as ammonia, methane, etc. When the cooling fluid 131 is a substance such as water that conducts electricity, for example, the conductive wire 121 is coated with an insulator. When a liquid is used as the cooling fluid 131, the coil device 105 is excellent in absorbing impact from the outside, and expansion and contraction due to a change in external pressure is suppressed when compared to gas.

The magnetic powder 132 is powder having magnetism. For example, "powder" corresponds to particulate matter having a diameter of several nm to several hundred μm, and may correspond to "particles" or "grains". Thermal conductivity of the magnetic powder 132 may be higher or lower than or equal to thermal conductivity of the cooling fluid 131. The magnetic powder 132 includes a main body part 132a and an outer layer 132b covering an outer circumferential surface of the main body part 132a. For example, a material such as ferrite is used as the main body part 132a. The outer layer 132b is a layer subjected to a surface treatment that lowers affinity with the cooling fluid 131. In other words, the magnetic powder 132 is treated with a surface treatment that lowers affinity with the cooling fluid 131. When oil (insulating oil) is used as the cooling fluid 131, the magnetic powder 132 is treated with a surface treatment that imparts hydrophilicity. When water is used as the cooling fluid 131, the magnetic powder 132 is treated with a surface treatment that imparts hydrophobicity.

As described above, the coil device 106 on the power reception side is provided in the vehicle 102. The coil device 106 has the same configuration as that of the coil device 105. That is, the coil device 106 includes the coil portion 140 having a flat plate shape, a flat plate-shaped magnetic member 161 on which the coil portion 140 is placed, a housing 162 accommodating the coil portion 140 and the magnetic member 161, and a coolant 150 located inside the housing 162.

The coil portion 140 includes a conductive wire 141 and a holding member 142 that holds the conductive wire 141 on a front surface side. For example, the holding member 142 has a rectangular flat plate shape, and a front surface of the holding member 142 faces the coil device 105 side. The conductive wire 141 is wound in a planar spiral shape on the front surface side of the holding member 142. For example, the housing 116 has a shape of a flat rectangular parallelepiped and includes a flat plate-shaped base 163 and a cover 164 covering the coil portion 140. The coolant 150 contains a cooling fluid 151 and magnetic powder 152 mixed in the cooling fluid 151. The coolant 150 (that is, the cooling fluid 151 and the magnetic powder 152) may have the same configuration as that of the coolant 130 or a different configuration therefrom. A further detailed description of each component overlaps with the description of each component of the coil device 105, and thus will be omitted.

In the wireless power transfer system 101 configured as described above, when a current flows through the conductive wire 121 of the coil device 105 by the power supply unit 110, heat is generated from the conductive wire 121 by electric resistance of the conductive wire 121. The heat generated in the conductive wire 121 is transmitted to the holding member 122, and thereafter is radiated to the outside of the housing 116 through the coolant 130.

When a current flows through the conductive wire 121, magnetic flux is generated in the coil portion 120. The magnetic flux from the coil portion 120 extends from a magnetic pole of the coil portion 120 present around the winding axis L1 toward a magnetic pole of the coil portion 140 present around a winding axis L2, and interlinks with the coil portion 140 of the coil device 106. In this way, the coil portions 120 and 140 are electromagnetically coupled to each other. In this instance, a current (for example, an induced current) flows through the conductive wire 141 of the coil portion 140. A phase of the current flowing through the coil portion 120 of the coil device 105 and a phase of the current flowing through the coil portion 140 of the coil device 106 may be different from each other. When a current flows through the conductive wire 141, heat is generated from the conductive wire 141. The heat generated in the conductive wire 141 is transmitted to the holding member 142, and thereafter is radiated to the outside of the housing 162 through the coolant 150.

As described above, the coil devices 105 and 106 are located inside the housings 116 and 162 and include coolants 130 and 150 having fluidity and thermal conductivity. When currents flow through the coil portions 120 and 140 of the coil devices 105 and 106 (specifically, the conductive wires 121 and 141), heat is generated in the coil portions 120 and 140, respectively. The heat generated in the coil portions 120 and 140 are radiated to the outside of the housings 116 and 162 through the coolants 130 and 150. Therefore, cooling efficiency of the coil portions 120 and 140 (specifically, the conductive wires 121 and 141) can be improved.

The coolants 130 and 150 have fluidity. For example, the coolants 130 and 150 are different from a thermally conductive insulating resin, etc. which is coated on a surface inside the housing and does not have fluidity. When heat is generated in the conductive wires 121 and 141, the coolants 130 and 150 are warmed. In this instance, the coolants 130 and 150 move inside the housings 116 and 162, respectively, due to natural convection caused by a temperature difference. In this way, the warmed coolants 130 and 150 do not remain on sides close to the coil portions 120 and 140, and the unheated coolants 130 and 150 move to the sides close to the coil portions 120 and 140. As a result, the cooling efficiency of the coil portions 120 and 140 can be improved.

The coolants 130 and 150 contain the cooling fluids 131 and 151 and the magnetic powders 132 and 152 mixed in the cooling fluids 131 and 151. The thermal conductivities of the magnetic powders 132 and 152 may be higher than the thermal conductivities of the cooling fluids 131 and 151 in some cases. By the coolants 130 and 150 containing such magnetic powders 132 and 152, thermal conductivities of the coolants 130 and 150 are improved. Therefore, the cooling efficiency of the coil portions 120 and 140 can be further improved.

The magnetic powder 132 of the coil device 105 is pulled by the magnetic pole of the coil portion 120 present around the winding axis L1 during wireless power transfer, and is located on a magnetic flux path between the coil portions 120 and 140. Similarly, the magnetic powder 152 of the coil device 106 is pulled by the magnetic pole of the coil portion 140 present around the winding axis L2 during wireless power transfer, and is located on the magnetic flux path between the coil portions 120 and 140. By the magnetic powders 132 and 152 being located on the magnetic flux path, the magnetic flux path is shortened accordingly. For this reason, the magnetic flux from the coil portion 120 becomes more likely to interlink with the coil portion 140. That is, a coupling coefficient between the coil portions 120 and 140 can be increased. As a result, the power transmission performance can be improved.

The magnetic powders 132 and 152 are subjected to a surface treatment for lowering the affinity between the magnetic powders 132 and 152 and the cooling fluids 131 and 151. By this configuration, aggregation between the magnetic powders 132 and aggregation between the magnetic powders 152 are suppressed, and eddy currents are less likely to flow in the magnetic powders 132 and 152. As a result, heat generation from the magnetic powders 132 and 152 is suppressed.

When a current flows through each of the coil portions 120 and 140 of each of the coil devices 105 and 106, a magnetic field is generated by each of the coil devices 105 and 106, and a magnetic force is generated in each of the magnetic powders 132 and 152 present in a gradient magnetic field. In the wireless power transfer system 101, the phases of the currents flowing through the coil portions 120 and 140 are different from each other, or directions and magnitudes of gradients of magnetic fields generated by these currents are different from each other, so that a difference occurs between magnetic forces acting on the magnetic powders 132 and 152, and a magnetic gradient is generated between the respective coil devices 105 and 106. A direction of the magnetic gradient is repeatedly inverted between the respective coil devices 105 and 106 in accordance with a period of a current (alternating current) flowing through each of the conductive wires 121 and 141. Since the magnetic powders 132 and 152 are pulled by the coil devices 105 and 106 on a stronger magnetic force side, directions in which the magnetic powders 132 and 152 are pulled are repeatedly inverted in accordance with the period of the current. For this reason, directions of movement of the magnetic powders 132 and 152 change. For example, the magnetic powders 132 and 152 vibrate. The coolants 130 and 150 are agitated by movement of the magnetic powders 132 and 152. In this way, the warmed coolants 130 and 150 do not remain on the sides close to the coil portions 120 and 140, and the unheated coolants 130 and 150 move to a side close to the holding member. Therefore, the cooling efficiency of the coil portions 120 and 140 can be improved.

The wireless power transfer system 101 includes the power supply unit 110 capable of switching the frequency of the current supplied to the coil device 105 on the power transmission side between the first frequency for wireless power transfer and the second frequency lower than the first frequency. When the current having the second frequency is supplied to the coil device 105, a timing at which a direction of a magnetic gradient generated between the respective coil devices 105 and 106 is reversed is delayed when compared to a case in which the current having the first frequency is supplied to the coil device 105, and a timing at which the directions in which the magnetic powders 132 and 152 are pulled are reversed is delayed. In other words, moving distances of the magnetic powders 132 and 152 are increased by switching the frequency of the current to the second frequency when compared to the case of the first frequency. By this configuration, moving distances of the cooling fluids 131 and 151 increase, and thus the coolants 130 and 150 are further agitated. Therefore, the cooling efficiency of the coil portions 120 and 140 can be improved.

Figure 15:
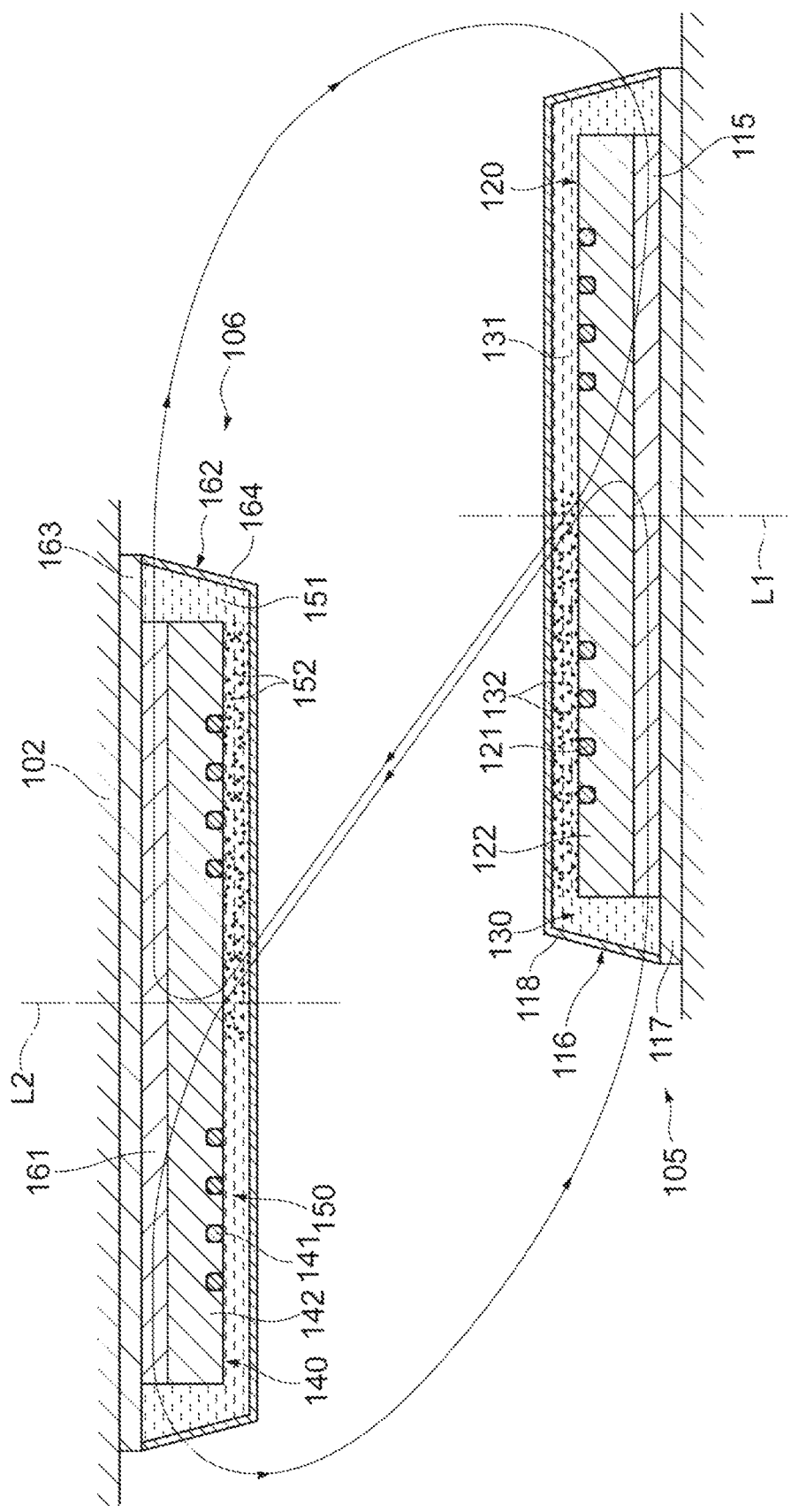
FIG. 15 is a side sectional view illustrating a state in which a misalignment occurs in the coil system of FIG. 12.

Here, a description will be given of a case in which a misalignment occurs in the coil devices 105 and 106. As illustrated in FIG. 15, a case in which the misalignment occurs in the coil devices 105 and 106 refers to a case in which the coil devices 105 and 106 are shifted from each other in a direction orthogonal to the winding axes L1 and L2. Parts of the coil devices 105 and 106 overlap each other when viewed in directions of the winding axes L1 and L2. In this case, the magnetic flux from the coil portion 120 extends from the magnetic pole of the coil portion 120 present around the winding axis L1 toward the magnetic pole of the coil portion 140 present around the winding axis L2, and interlinks with the coil portion 140 of the coil device 106. However, the magnetic flux path between the coil portions 120 and 140 becomes longer when compared to a case in which no misalignment occurs in the coil devices 105 and 106.

When a current flows through each of the conductive wires 121 and 141 of each of the coil devices 105 and 106, a magnetic field is generated by each of the coil devices 105 and 106, and a magnetic force is generated in each of the magnetic powders 132 and 152 present in a gradient magnetic field. In the wireless power transfer system 101, the phases of the currents flowing through the coil portions 120 and 140 are different from each other, or directions and magnitudes of gradients of magnetic fields generated by these currents are different from each other, so that a difference occurs between magnetic forces acting on the magnetic powders 132 and 152, and a magnetic gradient is generated between the respective coil devices 105 and 106. In the coil device 105, in a direction orthogonal to the winding axis L1, the magnetic force increases toward the coil device 106, and the magnetic force decreases toward a side farther from the coil device 106. In the coil device 106, in a direction orthogonal to the winding axis L2, the magnetic force increases toward the coil device 105, and the magnetic force decreases toward a side farther from the coil device 105. As a result, the magnetic powder 132 of the coil device 105 moves toward the coil device 106 side including the magnetic flux path, and the magnetic powder 152 of the coil device 106 moves toward the coil device 105 side including the magnetic flux path. By the magnetic powders 132 and 152 being located on the magnetic flux path, the magnetic flux path is shortened accordingly. That is, a magnetic flux path from the coil portion 120 shortens by a region in which the magnetic powder 132 is present and a region in which the magnetic powder 152 is present. In this way, by the presence of the magnetic powders 132 and 152, magnetic flux from the coil portion 120 is more likely to interlink with the coil portion 140. In other words, a decrease in coupling coefficient between the coil portions 120 and 140 is suppressed. As a result, it is possible to suppress a decrease in power transmission performance.

Seventh Embodiment

Figure 16:
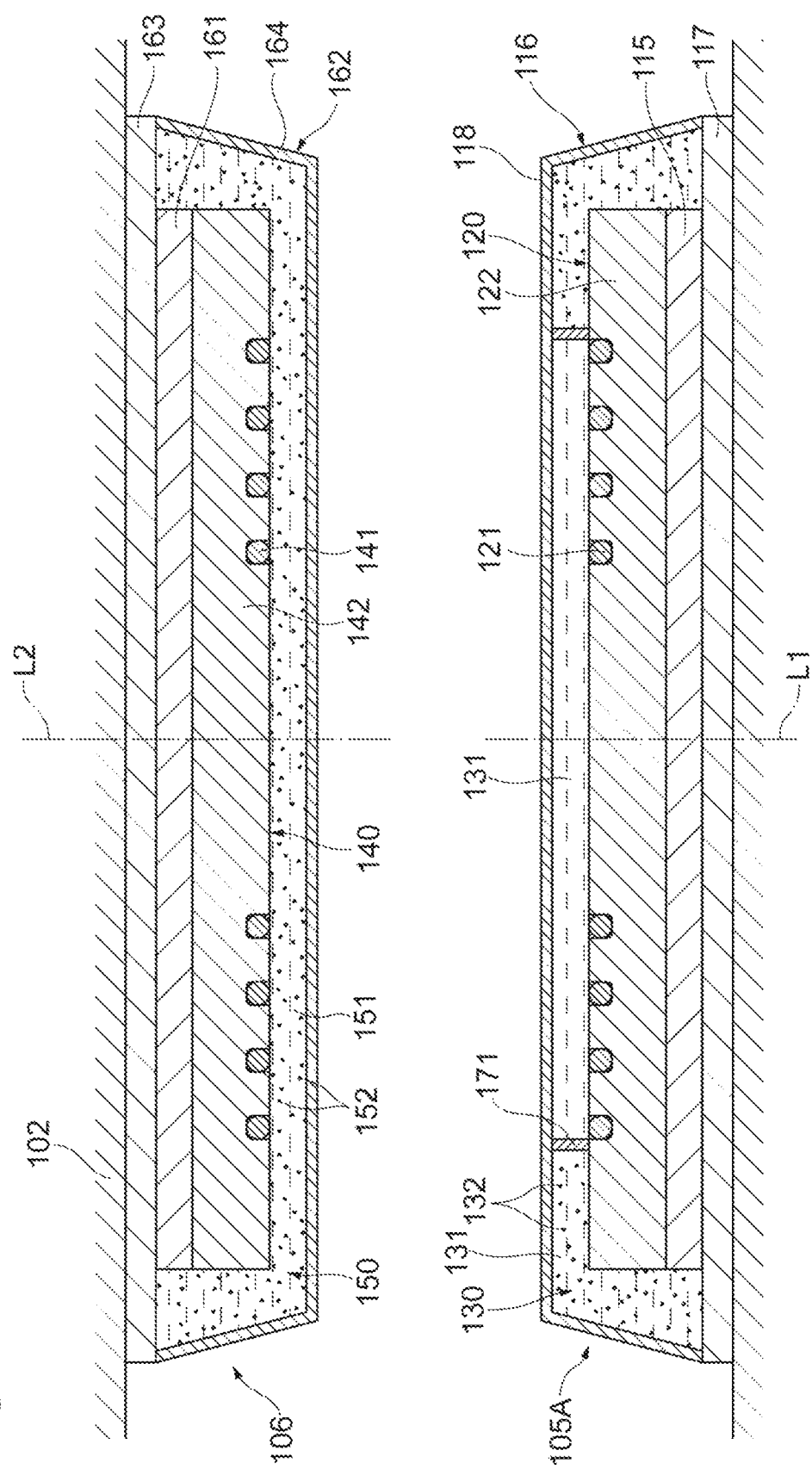
FIG. 16 is a side sectional view illustrating a coil device on a power transmission side and a coil device on a power reception side included in a coil system according to a seventh embodiment of this disclosure.
Figure 17:
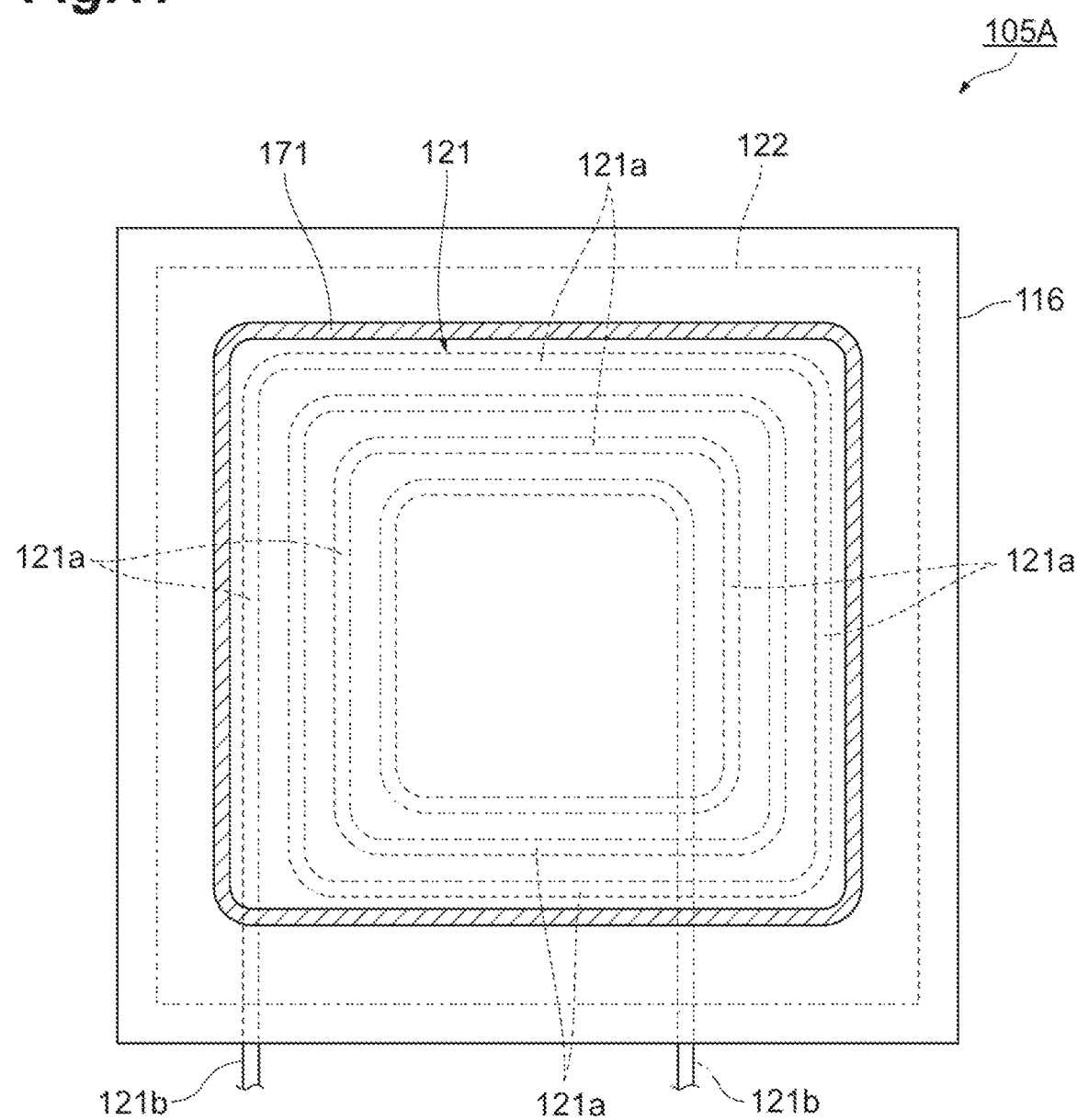
FIG. 17 is a plan view illustrating the coil device on the power transmission side of FIG. 16.

A coil device 105A according to a seventh embodiment will be described with reference to FIG. 16 and FIG. 17. As illustrated in FIG. 16 and FIG. 17, the coil device 105A may further include a restriction member 171 that surrounds a winding axis L1 of a conductive wire 121 to allow passage of a cooling fluid 131 and restrict passage of magnetic powder 132.

The restriction member 171 is located between a surface of a holding member 122 and an inner surface of a cover 118. As illustrated in FIG. 17, the restriction member 171 is a substantially rectangular annular member. The restriction member 171 extends around four extending portions 121a forming an outermost circumference to surround the wound conductive wire 121 when viewed in a direction of the winding axis L1. For example, a filter, etc. is used as the restriction member 171. The magnetic powder 132 is present outside the restriction member 171. The restriction member 171 restricts movement of the magnetic powder 132 to the winding axis L1 side by an aperture of a hole of the filter being set to be smaller than a size of the magnetic powder 132. The restriction member 171 allows passage of the cooling fluid 131 by the aperture of the hole of the filter being set to be larger than a particle size of the cooling fluid 131.

In this way, the magnetic powder 132 may be moved away from a magnetic pole present around the winding axis L1 of the wound conductive wire 121. For this reason, it is possible to inhibit magnetic flux generated from one magnetic pole of the coil device 105A from returning to the other magnetic pole of the coil device 105A without passing through a coil device 106 (so-called self-return of magnetic flux) due to an influence of the magnetic powder 132. For this reason, magnetic flux from a coil portion 120 of the coil device 105A is more likely to interlink with a coil portion 140 of the coil device 106. That is, it is possible to increase a coupling coefficient between the coil portions 120 and 140. As a result, it is possible to improve the power transmission performance.

Even though it is presumed that the restriction member 171 extends around the four extending portions 121a forming the outermost circumference to surround the wound conductive wire 121 when viewed in the direction of the winding axis L1, the restriction member 171 may be further disposed on the winding axis L1 side if the self-return of the magnetic flux is within an allowable range. The restriction member 171 may be disposed close to a part around a peripheral portion of the holding member 122 to more reliably suppress the self-return of the magnetic flux.

The sixth and seventh embodiments of this disclosure have been described. However, the invention is not limited to the above embodiments.

Figure 18A:
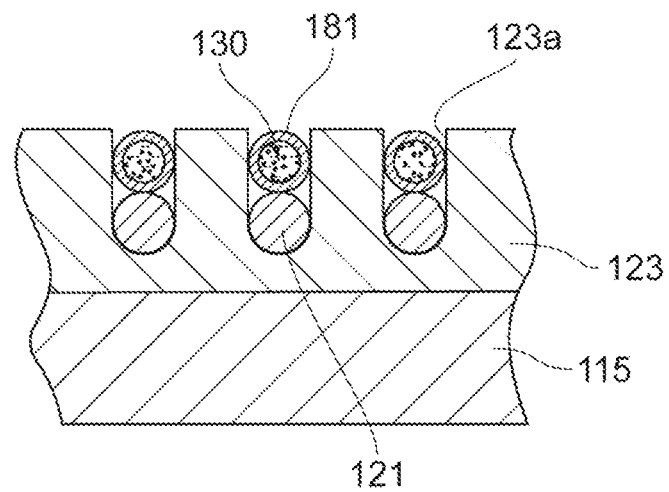
FIG. 18A and FIG. 18B are side sectional views illustrating modifications of the coil system of FIG. 12, respectively.

For example, even though the coolants 130 and 150 are located between the housing 116 and the coil portion 120 and between the housing 162 and the coil portion 140 in the above sixth and seventh embodiments, the coolants 130 and 150 may be located at any positions inside the housings 116 and 162. For example, as illustrated in FIG. 18A, the coolant may be provided inside a holding member 123 of the coil portion 120. The holding member 123 includes a groove 123a which is open to a surface side of the holding member 123. The conductive wire 121 and a tube 181 having an insulating property come into contact with each other to be adjacent to each other in a depth direction of the groove 123a and are accommodated in the groove 123a. The coolant 130 is accommodated in the tube 181. By this configuration, heat generated in the conductive wire 121 is rapidly transmitted to the coolant 130 through the tube 181. Therefore, cooling efficiency of the coil portion 120 may be further improved. If the conductive wire 121 is coated with an insulator, the tube 181 may not have the insulating property.

Figure 18B:
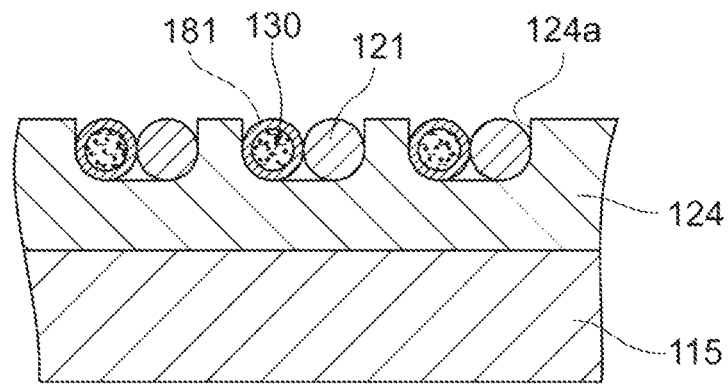

As illustrated in FIG. 18B, the coolant 130 may be provided inside a holding member 124 of the coil portion 120. The holding member 124 includes a groove 124a which is open to a surface side of the holding member 124. The conductive wire 121 and a tube 181 having an insulating property come into contact with each other to be adjacent to each other in a direction parallel to a surface of the holding member 124 and are accommodated in the groove 124a. The coolant 130 is accommodated in the tube 181. By this configuration, heat generated in the conductive wire 121 is rapidly transmitted to the coolant 130 through the tube 181. Therefore, cooling efficiency of the coil portion 120 may be further improved. If the conductive wire 121 is coated with an insulator, the tube 181 may not have the insulating property.

The coolant 130 may be located inside the magnetic member 115. In this case, heat generated in the conductive wire 121 is transmitted to the coolant 130 through the holding member 122 and the magnetic member 115. Heat from the conductive wire 121 is not directly transmitted to the coolant 130. However, air is not interposed or hardly interposed in a heat transfer path. Therefore, the cooling efficiency of the coil portion 120 can be improved. The conductive wire 121 may be hollow and the coolant 130 may be located inside the conductive wire 121.

In the above sixth and seventh embodiments, it is presumed that the phase of the current flowing through the coil portion 120 of the coil device 105 can be different from the phase of the current flowing through the coil portion 140 of the coil device 106. However, at least one of the phase and amplitude may be different between the current flowing through the coil portion 120 and the current flowing through the coil portion 140. In this case, similarly to the above description, a magnetic gradient is generated between the respective coil devices 105 and 106, and thus directions of movement of the magnetic powders 132 and 152 change. As a result, the coolants 130 and 150 are agitated. Therefore, it is possible to improve cooling efficiency of the coil portions 120 and 140.

In the above sixth and seventh embodiments, it is presumed that the coil devices 105 and 106 have the same configuration. However, for example, a configuration of this disclosure may be applied to only the coil device 105 or only the coil device 106. For example, when the coolant 130 is provided only in the coil device 105 on the power transmission side, it is possible to improve cooling efficiency of the coil portion 120 on the power transmission side. When the coolant 150 is provided only in the coil device 106 on the power reception side, it is possible to improve cooling efficiency of the coil portion 140 on the power reception side. When a coolant containing magnetic powder (the magnetic powder 132 or the magnetic powder 152) is provided in any one of the coil device 105 and the coil device 106, a direction of movement of the magnetic powder changes in the one of the coil devices in response to a reversal of a magnetic gradient. Further, when a frequency of a current supplied to the coil device 105 is switched between the first frequency and the second frequency, a moving distance of the magnetic powder increases in the one of the coil devices. Due to occurrence of these actions, it is possible to further improve cooling efficiency of the coil portion in the one of the coil devices. The restriction member that restricts passage of the magnetic powder may be provided only in the coil device on the power reception side or in both the coil devices on the power transmission side and the power reception side.

In the above sixth and seventh embodiments, the circular type coil portions 120 and 140 are adopted. However, the invention is not limited thereto. For example, it is possible to adopt a solenoid coil portion in which a conductive wire is spirally wound in a three-dimensional spatial manner. In this case, a shape of the holding member that holds the conductive wire may correspond to any one of a flat square tubular shape, a cylindrical shape, an elliptic cylindrical shape, etc.

In the above sixth and seventh embodiments, it is presumed that the coolants 130 and 150 are located inside the housings 116 and 162. However, the coolants may circulate inside and outside the housings 116 and 162. For example, the tube 181 illustrated in FIG. 18 may be extended to the outside of the housings 116 and 162, and the coolants 130 and 150 may be circulated inside and outside the housing 116.

It is possible to provide a Peltier element including two metal plates and a metal electrode and a semiconductor provided therebetween. In this case, one of the metal plates is indirectly or directly brought into contact with the coolant 130 of the coil device 105 on the power transmission side. Then, heat from the coolant 130 absorbing heat is transmitted to the one metal plate. The other metal plate is exposed to a surrounding environment. By this configuration, a temperature difference is created between the two metal plates, and power generation using the Seebeck effect is performed. Therefore, thermal energy may be converted into electric energy, and energy may be efficiently used.

In the above sixth and seventh embodiments, a description has been given of a case in which this disclosure is applied to the wireless power transfer system among coil systems. However, the application is not limited to the wireless power transfer system. For example, this disclosure may be applied to a coil system such as an inductive heating system, an eddy current flaw detecting system, etc.

INDUSTRIAL APPLICABILITY

According to some aspects of this disclosure, it is possible to improve cooling efficiency of a conductive wire or a coil portion.

REFERENCE SIGNS LIST 1 coil device
2 coil portion
3 supply pipe
4 discharge pipe
5 pump
6 magnetic member
6a hole
7 housing
7a base
7b cover
7c hole
8 heat exchanger
9 connector
10 conductive wire
10a outer circumferential surface
11 first extending portion
12 second extending portion
13 third extending portion
14 fourth extending portion
15 first lead-out portion
16 second lead-out portion
20 holding member
21 upper member
21a groove
22 lower member
23 intermediate member
30 cooling flow path
31 inflow portion
32 first straight portion
33 second straight portion
34 third straight portion
35 fourth straight portion
36 fifth straight portion
37 outflow portion
40 cooling flow path
41 inflow portion
42 straight portion
43 outflow portion
50 cooling flow path
51 inflow portion
52 radiating portion
53 outer periphery
54 outflow portion
60 cooling flow path
61 first straight portion
62 second straight portion
63 third straight portion
64 fourth straight portion
65 outflow portion
70 cooling flow path
71 inflow portion
72 relay portion
73 outflow portion
A first region
B second region
101 wireless power transfer system
102 vehicle
103 power transmitter
104 power receiver
105 coil device
106 coil device
107 power reception circuit
108 charging circuit
109 battery
110 power supply unit 111 external power supply
112 rectification circuit
113 power transmission circuit
114 controller
115 magnetic member
116 housing
117 base
118 cover
120 coil portion
121 conductive wire
122 holding member
123 holding member
124 holding member
130 coolant
131 cooling fluid
132 magnetic powder
132a main body part
132b outer layer
140 coil portion
141 conductive wire
142 holding member
150 coolant
151 cooling fluid
152 magnetic powder
161 magnetic member
162 housing
163 base
164 cover
171 restriction member
181 tube
L1 winding axis (central axis)

The invention claimed is:

1. A first coil device comprising:
a first coil portion;
a housing that accommodates the first coil portion;
a coolant located inside the housing, the coolant having fluidity and thermal conductivity;
the first coil portion including a conductive wire and a holding member that holds the conductive wire; the holding member made of a nonmagnetic and insulating material; the coolant containing a cooling fluid and magnetic powder mixed in the cooling fluid;
wherein the magnetic powder is treated with a surface treatment that lowers affinity with the cooling fluid;
the first coil portion including a conductive wire and a holding member that holds the conductive wire:
the conductive wire of the first coil portion wound in a planar spiral shape in the holding member;
the first coil device including a restriction member that surrounds a central axis of the wound conductive wire to allow passage of the cooling fluid and restrict passage of the magnetic powder;
the magnetic powder being present outside the restriction member and
the restriction member restricting movement of the magnetic powder into the central axis side.

2. A coil system comprising:
the first coil device according to claim 1; and
a second coil device including a second coil portion,
wherein at least one of a phase or an amplitude is different between a current flowing through the first coil portion of the first coil device and a current flowing through the second coil portion of the second coil device.

3. The coil system according to claim 2, the coil system corresponding to a coil system performing wireless power transfer between the first coil device and the second coil device, the coil system further comprising:
a power supply unit connected to the first coil device on a power transmission side, the power supply unit being capable of switching a frequency of a current supplied to the first coil device between a first frequency for wireless power transfer and a second frequency smaller than the first frequency.

4. The coil system according to claim 2, the coil system corresponding to a coil system performing wireless power transfer between the first coil device and the second coil device, the coil system further comprising:
a power supply unit connected to the second coil device on a power transmission side, the power supply unit being capable of switching a frequency of a current supplied to the second coil device between a first frequency for wireless power transfer and a second frequency smaller than the first frequency.

5. The coil device according to claim 1, wherein the holding member is made of a polyphenylene sulfide resin material.

* * * * *